US010019135B1

(12) United States Patent
Morris

(10) Patent No.: US 10,019,135 B1
(45) Date of Patent: Jul. 10, 2018

(54) METHODS, AND COMPUTER PROGRAM PRODUCTS FOR CONSTRAINING A COMMUNICATION EXCHANGE

(71) Applicant: Sitting Man, LLC, Raleigh, NC (US)

(72) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 0 days.

(21) Appl. No.: 15/803,739

(22) Filed: Nov. 3, 2017

Related U.S. Application Data

(63) Continuation-in-part of application No. 15/800,033, filed on Oct. 31, 2017, which is a continuation-in-part (Continued)

(51) Int. Cl.
*G06F 15/16* (2006.01)
*G06F 3/0482* (2013.01)
(Continued)

(52) U.S. Cl.
CPC .......... *G06F 3/0482* (2013.01); *G06F 17/243* (2013.01); *H04L 51/04* (2013.01);
(Continued)

(58) Field of Classification Search
CPC ...... G06Q 10/107; G06Q 10/06; H04L 51/12; H04L 51/08; H04L 51/043; H04L 51/22;
(Continued)

(56) References Cited

U.S. PATENT DOCUMENTS 6,192,394 B1   2/2001   Gutfreund et al.
6,502,236 B1   12/2002  Allen et al.
(Continued)

FOREIGN PATENT DOCUMENTS

WO   2002077773 A3   6/2009

OTHER PUBLICATIONS

Berners-Lee, T, et al, "Uniform Resource Identifier (URI): Generic Syntax", RFC 3986, pp. 1-61, Jan. 2005, Internet Engineering Task Force (IEFT), http://www.ietf.org/rfc/rfc3986.txt.
(Continued)

*Primary Examiner* — Jungwon Chang
(74) *Attorney, Agent, or Firm* — Patrick E. Caldwell, Esq.; The Caldwell Firm, LLC

(57) ABSTRACT

In one embodiment, a computer-implemented method is provided, comprising: creating at least a portion of an instant messaging application that is configured to cooperate with an apparatus, the instant messaging application, when executed, configured to cause a device to: display an instant messaging interface including a communicant message user interface element for receiving a text portion of a message and a send user interface element for sending the text portion of the message in response to a user selection thereof, and receive, from the apparatus and utilizing a communications agent on the device configured to receive incoming messages addressed to a communicant identifier associated with a user of the instant messaging application, a notification including a constraint that identifies a plurality of user interface elements includable in a form presentable via the instant messaging interface for constraining a generation of one or more data object requests in response to a selection on one or more of the plurality of user interface elements.

30 Claims, 15 Drawing Sheets

Related U.S. Application Data of application No. 14/274,623, filed on May 9, 2014, now abandoned, which is a continuation-in-part of application No. 13/654,647, filed on Oct. 18, 2012, now abandoned, which is a continuation-in-part of application No. 13/716,156, filed on Dec. 16, 2012, now abandoned, which is a continuation-in-part of application No. 13/716,159, filed on Dec. 16, 2012, now abandoned.

(51) Int. Cl.
*G06F 17/24* (2006.01)
*H04L 12/58* (2006.01)
*G06F 17/22* (2006.01)
*G06F 3/0481* (2013.01)
*G06F 17/21* (2006.01)
*G06F 9/451* (2018.01)

(52) U.S. Cl.
CPC ............ *G06F 3/0481* (2013.01); *G06F 9/451* (2018.02); *G06F 17/212* (2013.01); *G06F 17/2247* (2013.01); *H04L 51/02* (2013.01); *H04L 51/046* (2013.01); *H04L 51/08* (2013.01); *H04L 51/18* (2013.01); *H04L 51/32* (2013.01)

(58) Field of Classification Search
CPC ....... H04L 51/04; H04L 51/046; H04L 51/02; H04L 51/32; H04L 51/18; G06F 3/0481; G06F 3/0482; G06F 17/2247; G06F 17/243; G06F 17/212; G06F 9/451
USPC ........ 709/206, 223; 715/752, 779, 759, 753; 706/60; 717/125, 101
See application file for complete search history.

(56) References Cited

U.S. PATENT DOCUMENTS

| | | |
|---|---|---|
| 6,996,599 B1 | 2/2006 | Anders et al. |
| 7,051,119 B2 | 5/2006 | Shafron et al. |
| 7,080,120 B2 | 7/2006 | Betros et al. |
| 7,124,123 B1* | 10/2006 | Roskind ............ H04L 51/04 706/60 |
| 7,130,883 B2 | 10/2006 | Zhu et al. |
| 7,133,897 B1 | 11/2006 | Tran |
| 7,209,953 B2 | 4/2007 | Brooks |
| 7,328,239 B1 | 2/2008 | Berberian et al. |
| 7,421,069 B2 | 9/2008 | Vernon et al. |
| 7,426,578 B2 | 9/2008 | Jones et al. |
| 7,529,798 B2 | 5/2009 | Rust |
| 7,533,146 B1 | 5/2009 | Kumar |
| 7,567,553 B2 | 7/2009 | Morris |
| 7,613,772 B2 | 11/2009 | Bartram et al. |
| 7,623,650 B2 | 11/2009 | Dalton et al. |
| 7,624,148 B2 | 11/2009 | Dalen |
| 7,653,668 B1 | 1/2010 | Shelat et al. |
| 7,680,950 B1 | 3/2010 | Slaughter et al. |
| 7,701,882 B2 | 4/2010 | Jones et al. |
| 7,757,265 B2 | 7/2010 | Reynolds et al. |
| 7,765,581 B1 | 7/2010 | Caronni et al. |
| 7,783,718 B2 | 8/2010 | Modi |
| 7,809,709 B1 | 10/2010 | Harrison |
| 7,809,854 B2 | 10/2010 | Jung et al. |
| 7,904,369 B1 | 3/2011 | Andreasen et al. |
| 7,949,722 B1 | 5/2011 | Ullman et al. |
| 7,953,853 B2 | 5/2011 | Christensen et al. |
| 8,020,190 B2 | 9/2011 | Plummer |
| 8,060,619 B1 | 11/2011 | Saulpaugh et al. |
| 8,214,329 B2 | 7/2012 | Gilder et al. |
| 8,224,298 B2 | 7/2012 | Smith et al. |
| 8,280,948 B1 | 10/2012 | Chen |
| 8,321,499 B2 | 11/2012 | Reisman |
| 8,332,654 B2 | 12/2012 | Anbuselvan |
| 8,359,361 B2 | 1/2013 | Thornton et al. |
| 8,583,745 B2 | 11/2013 | Bearman et al. |
| 8,671,145 B2 | 3/2014 | Roskowski et al. |
| 8,683,576 B1 | 3/2014 | Yun |
| 8,719,251 B1 | 5/2014 | English et al. |
| 8,775,511 B2 | 7/2014 | Vernon et al. |
| 8,812,733 B1 | 8/2014 | Black et al. |
| 8,824,643 B2 | 9/2014 | Sahai |
| 8,849,914 B2 | 9/2014 | Bove et al. |
| 8,909,710 B2 | 12/2014 | Blackstock et al. |
| 8,949,340 B2 | 2/2015 | Smith et al. |
| 8,996,658 B2 | 3/2015 | Anbuselvan |
| 9,053,203 B2 | 6/2015 | Wilson et al. |
| 9,299,056 B2 | 3/2016 | Kallman et al. |
| 2002/0087505 A1 | 7/2002 | Smith et al. |
| 2002/0087522 A1 | 7/2002 | MacGregor et al. |
| 2002/0143855 A1 | 10/2002 | Traversat et al. |
| 2002/0147840 A1 | 10/2002 | Mutton et al. |
| 2003/0172127 A1 | 9/2003 | Northrup et al. |
| 2003/0200268 A1 | 10/2003 | Morris |
| 2004/0015610 A1 | 1/2004 | Treadwell |
| 2004/0024754 A1 | 2/2004 | Mane et al. |
| 2004/0044727 A1 | 3/2004 | Abdelaziz et al. |
| 2004/0064478 A1 | 4/2004 | Canesi |
| 2004/0064511 A1 | 4/2004 | Abdel-Aziz et al. |
| 2004/0088347 A1 | 5/2004 | Yeager et al. |
| 2004/0117456 A1 | 6/2004 | Brooks |
| 2004/0186894 A1 | 9/2004 | Jhingan et al. |
| 2005/0010646 A1 | 1/2005 | Shiina |
| 2005/0102348 A1 | 5/2005 | Parsons et al. |
| 2005/0114664 A1 | 5/2005 | Davin |
| 2005/0114671 A1 | 5/2005 | Little et al. |
| 2005/0223073 A1 | 10/2005 | Malik |
| 2006/0069787 A1 | 3/2006 | Sinclair et al. |
| 2006/0095531 A1 | 5/2006 | Cho |
| 2006/0123353 A1* | 6/2006 | Matthews ............ G06F 3/0481 715/779 |
| 2006/0224583 A1 | 10/2006 | Fikes et al. |
| 2006/0224608 A1 | 10/2006 | Zamir et al. |
| 2006/0224615 A1 | 10/2006 | Korn et al. |
| 2006/0224624 A1 | 10/2006 | Korn et al. |
| 2006/0224938 A1 | 10/2006 | Fikes et al. |
| 2006/0256934 A1 | 11/2006 | Mazor |
| 2007/0067726 A1 | 3/2007 | Flynt et al. |
| 2007/0078902 A1 | 4/2007 | Buschi et al. |
| 2007/0100713 A1 | 5/2007 | Favero et al. |
| 2007/0180150 A1 | 8/2007 | Eisner et al. |
| 2007/0271340 A1* | 11/2007 | Goodman ............ G06Q 10/107 709/206 |
| 2008/0005103 A1 | 1/2008 | Ratcliffe et al. |
| 2008/0016160 A1 | 1/2008 | Walter et al. |
| 2008/0059500 A1 | 3/2008 | Symens |
| 2008/0098075 A1 | 4/2008 | O'Bryan et al. |
| 2008/0155110 A1 | 6/2008 | Morris |
| 2008/0163075 A1* | 7/2008 | Beck ...................... H04L 51/12 715/759 |
| 2008/0201364 A1 | 8/2008 | Buschi et al. |
| 2008/0256199 A1 | 10/2008 | Pesala |
| 2008/0320094 A1 | 12/2008 | Tu et al. |
| 2009/0157829 A1 | 6/2009 | Choi et al. |
| 2009/0157859 A1* | 6/2009 | Morris ............ H04L 29/12594 709/223 |
| 2009/0177526 A1 | 7/2009 | Aaltonen et al. |
| 2009/0222450 A1 | 9/2009 | Zigelman |
| 2009/0254601 A1 | 10/2009 | Moeller et al. |
| 2009/0265426 A1 | 10/2009 | Svendsen et al. |
| 2009/0327904 A1 | 12/2009 | Guzak et al. |
| 2010/0011077 A1 | 1/2010 | Shkolnikov et al. |
| 2010/0070602 A1 | 3/2010 | Malik |
| 2010/0169442 A1 | 7/2010 | Liu et al. |
| 2010/0235439 A1 | 9/2010 | Goodnow |
| 2010/0312782 A1 | 12/2010 | Li et al. |
| 2011/0072033 A1 | 3/2011 | White et al. |
| 2011/0138004 A1* | 6/2011 | McConn ............ G06Q 10/107 709/206 |
| 2011/0225245 A1* | 9/2011 | Bhogal ............ G06Q 10/107 709/206 |
| 2011/0276637 A1 | 11/2011 | Thornton et al. |

(56) References Cited

U.S. PATENT DOCUMENTS

| | | | |
|---|---|---|---|
| 2012/0011207 A1* | 1/2012 | Morris | H04L 51/08 709/206 |
| 2012/0011444 A1 | 1/2012 | Morris | |
| 2012/0072856 A1* | 3/2012 | Park | H04L 51/043 715/752 |
| 2013/0046992 A1 | 2/2013 | Resch et al. | |
| 2013/0110565 A1* | 5/2013 | Means, Jr. | G06Q 10/06 705/7.11 |
| 2013/0125019 A1* | 5/2013 | Vymenets | G06Q 10/107 715/752 |
| 2013/0138744 A1* | 5/2013 | Rajamanthiram | H04L 51/22 709/206 |
| 2014/0089419 A1 | 3/2014 | Morris | |
| 2014/0089420 A1 | 3/2014 | Morris | |
| 2014/0089421 A1 | 3/2014 | Morris | |
| 2014/0108487 A1 | 4/2014 | Rosset et al. | |
| 2014/0112319 A1 | 4/2014 | Morris | |
| 2014/0172999 A1 | 6/2014 | Morris | |
| 2014/0279050 A1 | 9/2014 | Makar et al. | |

OTHER PUBLICATIONS

Crocker, D, "Standard for the Format of ARPA Internet Text Messages", RFC 822, pp. 1-47, Aug. 1982, Internet Engineering Task Force (IEFT), http://www.ietf.org/rfc/rfc822.txt.

Fielding, R, et al, "Hypertext Transfer Protocol—HTIP/1.1", RFC 2616, pp. 1-114, Jun. 1999, Internet Engineering Task Force (IEFT), http://www.ietf.org/rfc/rfc2616.txt.

Freed, N, et al, "Multipurpose Internet Mail Extensions (MIME) Part 1: Format of Internet Message Bodies", RFC 2045, pp. 1-31, Nov. 1996, Internet Engineering Task Force (IEFT), http://www.ietf.org/rfc/rfc2045.txt.

Hoffman, P, et al, "The mailto URL scheme", RFC 2368, pp. 1-10, Jul. 1998, Internet Engineering Task Force (Ie FT), http://www.ietf.org/rfc/rfc2368.txt.

Klensin, J, "Simple Mail Transfer Protocol", RFC 5321, pp. 1-95, Oct. 2008, Internet Engineering Task Force (IEFT), http://www.ietf.org/rfc/rfc5321.txt.

Myers, J, et al, "Post Office Protocol—version 3", RFC 1939, pp. 1-23, May 1996, Internet Engineering Task Force (IEFT), http://www.ietf.org/rfc/rfc1939.txt.

O. S. Goh, C. C. Fung and K. W. Wong, "VisualChat: A Visualization Tool for Human-Machine Interaction," 2008 IEEE/ WIC/ACM International Conference on Web Intelligence and Intelligent Agent Technology, Sydney, NSW, 2008, pp. 131-134, available at http://ieeexplore.ieee.org/document/4740744/?reload=true.

Office Action Summary in U.S. Appl. No. 12/833,014 dated Aug. 2, 2012.

Office Action Summary in U.S. Appl. No. 12/833,016 dated Feb. 14, 2014.

Office Action Summary in U.S. Appl. No. 12/833,016 dated May 10, 2013.

Office Action Summary in U.S. Appl. No. 12/833,016 dated Sep. 20, 2012.

Office Action Summary in U.S. Appl. No. 13/624,906, dated Dec. 31, 2014.

Office Action Summary in U.S. Appl. No. 13/624,940, dated Jul. 18, 2014.

Office Action Summary in U.S. Appl. No. 13/626,635, dated Aug. 29, 2014.

Office Action Summary in U.S. Appl. No. 13/647,144 dated Dec. 1, 2014.

Office Action Summary in U.S. Appl. No. 13/656,647 dated Sep. 25, 2014.

Office Action Summary in U.S. Appl. No. 13/716,156 dated Mar. 26, 2015.

Office Action Summary in U.S. Appl. No. 13/716,158 dated May 8, 2015.

Office Action Summary in U.S. Appl. No. 13/716,159 dated Oct. 7, 2015.

Office Action Summary in U.S. Appl. No. 13/716,160 dated Oct. 26, 2015.

Office Action Summary in U.S. Appl. No. 14/274,623 dated Mar. 29, 2017.

Office Action Summary in U.S. Appl. No. 14/274,623 dated Oct. 3, 2016.

Press Release, "Amazon.com Launches Amazon "TextBuyIt," Making It Fast and Easy for Customers to Shop and Buy on Amazon.com Using Text Messages", Amazon, Apr. 2, 2008, available at http://phx.corporate-ir.net/phoenix.zhtml?c-176060&p=irol-newsArticle&ID=1124741.

Press Release, "Premier wireless operator in the US selects eGain virtual assistant technology to provide innovative, multilingual customer self-service" eGain, Oct. 6, 2011, available at http://www.egain.com/company/news/press_releases_2011/premier-wireless-operator-in-the-us-selects-egain-virtual-assistant-technology-to-provide-innovative-multilingual-customer-self-service/.

Resnick, E, "Internet Message Format", RFC 5322, pp. 1-57, Oct. 2008, Internet Engineering Task Force (IEFT), http://www.ietf.org/rfc/rfc5322.txt.

Richardson T, et al, "The Remote Framebuffer Protocol", RFC 6143, pp. 1-39, Mar. 2011, Internet Engineering Task Force (IEFT), http://www.ietf.org/rfc/rfc6143.txt.

Rosenberg, J, et al, "SIP: Session Initiation Protocol", RFC 3261, pp. 1-269, Jun. 2002: Internet Engineering Task Force (IEFT), http://www.ietf.org/rfc/rfc3261.txt.

Rothman, Wilson "Amazon "Simple" TextBuyIt Text-Message Shopping Sounds Complicated", Gizmodo, Apr. 2, 2008, available at https://gizmodo.com/375115/amazon-simple-textbuyit-text-message-shopping-sounds-complicated.

Simonite, Tom, "Shopping via Text Message," MIT Technology Review, Business Report, Nov. 23, 2010, available at https://www.technologyreview.com/s/421784/shopping-via-text-message/.

Website Page, "Sending video via text message", Android Central, Jan. 26, 2014, available at https://forums.androidcentral.com/motorola-droid-x/46718-sending-video-via-text-message.html.

Wilde, E, et al, "URI Scheme for Global System for Mobile Communications (GSM) Short Message Service", RFC 5724, pp. 1-18, Jan. 2010, Internet Engineering Task Force (IEFT), http://www.ietf.org/rfc/rfc5724.txt.

* cited by examiner

```
                                                      800a
MIME-Version: 1.0
Content-Type: multipart/mixed; boundary="--OoOT----toOo--------"
Content-Query-Schema: http://standards.org/communications/personal/query/request.id.xml
                        816a
--OoOT----toOo--------
Content-Type: text/plain
Hi, this is the first message                 814a
--OoOT----toOo--------
Content-Type: application/id-request          806a
Accept: image/*
<id-request>                    808a
    <and>                       812a
        <criterion attribute="query" type="keyword" match-expression=""Uncle Joe"" />         804a
810a    <criterion attribute="scope" ressource-type="content" />
    </and>
</id-request>
--OoOT----toOo--------
```
802a

Fig. 8A

```
                                                      800b
MIME-Version: 1.0
Content-Type: multipart/mixed; boundary="--toOo----OoOt--------"        802b
Query-Accept: application/id-request; application/regex-request --toOo----OoOt---------
Content-Type: text/plain
Dad, See attached.                    804b Love,
William
--toOo----OoOt---------                       808b
Content-Type: application/query-response FILE://Documents/Family/FamilyHistory.docx                806b
FILE://Documents/Letters/XmasLetter-2012.pdf
--toOo----OoOt---------
```

FIG. 8B

METHODS, AND COMPUTER PROGRAM PRODUCTS FOR CONSTRAINING A COMMUNICATION EXCHANGE

RELATED APPLICATIONS

The present application is a continuation-in-part of and claims priority to U.S. application Ser. No. 15/800,033 filed Oct. 31, 2017 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to U.S. application Ser. No. 14/274,623 (published as US 2014-0365588 A1) filed May 9, 2014 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to: U.S. application Ser. No. 13/654,647 (published as US 2014-0112319 A1) filed Oct. 18, 2012 and entitled "METHODS, SYSTEMS, AND COMPUTER PROGRAM PRODUCTS FOR CONSTRAINING A DATA EXCHANGE REQUESTED IN A COMMUNICATION," U.S. application Ser. No. 13/716,156 (published as US 2014-0172912 A1) filed Dec. 16, 2012 and entitled "METHODS, SYSTEMS, AND COMPUTER PROGRAM PRODUCTS FOR PROCESSING A SEARCH QUERY EXCHANGED VIA A COMMUNICATIONS PROTOCOL," and U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT," where U.S. application Ser. No. 13/716, 159 incorporates the following applications by reference:

Application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

Application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

Application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

Application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

Application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

Application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

Application Ser. No. 13/624,940 (published as US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT"; and Application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION", and where U.S. application Ser. No. 13/654,647 incorporates the following applications by reference:

Application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and Application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

The following applications are incorporated herein by reference:

U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT;"

Application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

Application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

Application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

Application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

Application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

Application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

Application Ser. No. 13/624,940 (published as US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT";

Application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION";

Application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and Application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

BACKGROUND

While receiving attachments in a network communication, such as email, is common, most attachments received are unsolicited or unrequested. To request an attachment, a user typically sends the request as voice and/or text data in a voice and/or communicant message heard and/or read by another user. The request may be as vague or as specific as the language used by the requesting user. The other user must interpret the request and find a file or other data object that seems to match the request. The other user in many cases locates a "matching" resource using a program or application other than the communications agent that received the request. For example, a search program may be used to search a hard-drive by the other user. The other user must enter the search criteria. It would be beneficial to allow users to exchange resources, for example, as attachments by automating portions of this process while maintaining privacy and security.

Accordingly, there exists a need for methods, systems, and computer program products for constraining a data exchange requested in a communication.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a computer-implemented method is provided, comprising: creating at least a portion of an instant messaging application that is configured to cooperate with an apparatus, the instant messaging application, when executed, configured to cause a device to: display an instant messaging interface including a communicant message user interface element for receiving a text portion of a message and a send user interface element for sending the text portion of the message in response to a user selection thereof, receive, from the apparatus and utilizing a communications agent on the device configured to receive incoming messages addressed to a communicant identifier associated with a user of the instant messaging application, a notification including a constraint that identifies a plurality of user interface elements includable in a form presentable via the instant messaging interface for constraining a generation of one or more data object requests in response to a selection on one or more of the plurality of user interface elements, in response to the receipt, from the apparatus and utilizing the communications agent on the device configured to receive the incoming messages addressed to the communicant identifier associated with the user of the instant messaging application, of the notification including the constraint that identifies the plurality of user interface elements: display, via the instant messaging interface, the form including the user interface elements which include a first button and a second button, receive, via the form of the instant messaging interface, an indication of a selection on the first button of the form displayed via the instant messaging interface, in response to the receipt, via the form of the instant messaging interface, of the indication of the selection on the first button of the form displayed via the instant messaging interface: generate a first data object request corresponding to the first button of the form displayed via the instant messaging interface, where the generation of the first data object request is constrained by the constraint, in response to the generation of the first data object request corresponding to the first button of the form displayed via the instant messaging interface: send, to the apparatus and utilizing the communications agent on the device configured to send outgoing messages addressed from the communicant identifier associated with the user of the instant messaging application, a first request message that includes the first data object request, after sending, to the apparatus and utilizing the communications agent on the device configured to send the outgoing messages addressed from the communicant identifier associated with the user of the instant messaging application, the first request message that includes the first data object request: receive, from the apparatus and utilizing the communications agent on the device configured to receive the incoming messages addressed to the communicant identifier associated with the user of the instant messaging application, a first response message, after sending, to the apparatus and utilizing the communications agent on the device configured to send the outgoing messages addressed from the communicant identifier associated with the user of the instant messaging application, the first request message that includes the first data object request: receive, from the apparatus and utilizing the communications agent on the device configured to receive the incoming messages addressed to the communicant identifier associated with the user of the instant messaging application, a first data object response including at least one first image, the first data object response being attached to the first response message, in response to the receipt, from the apparatus and utilizing the communications agent on the device configured to receive the incoming messages addressed to the communicant identifier associated with the user of the instant messaging application, of the first response message and the first data object response including the at least one first image: display, via the instant messaging interface, the at least one first image, receive, via the form of the instant messaging interface, an indication of a selection on the second button of the form displayed via the instant messaging interface, in response to the receipt, via the form of the instant messaging interface, of the indication of the selection on the second button of the form displayed via the instant messaging interface: generate a second data object request corresponding to the second button of the form displayed via the instant messaging interface, where the generation of the second data object request is constrained by the constraint, in response to the generation of the second data object request corresponding to the second button of the form displayed via the instant messaging interface: send, to the apparatus and utilizing the communications agent on the device configured to send the outgoing messages addressed from the communicant identifier associated with the user of the instant messaging application, a second request message that includes the second data object request, after sending, to the apparatus and utilizing the communications agent on the device configured to send the outgoing messages addressed from the communicant identifier associated with the user of the instant messaging application, the second request message that includes the second data object request: receive, from the apparatus and utilizing the communications agent on the device configured to receive the incoming messages addressed to the communicant identifier associated with the user of the instant messaging application, a second response message, after sending, to the apparatus and utilizing the communications agent on the device configured to send the outgoing messages addressed from the communicant identifier associated with the user of the instant messaging application, the second request message that includes the second data object request: receive, from the apparatus and utilizing the communications agent on the device configured to receive the incoming messages addressed to the communicant identifier associated with the user of the instant messaging application, a second data object response including at least one second image, the second data object response being attached to the second response message, and in response to the receipt, from the apparatus and utilizing the communications agent on the device configured to receive the incoming messages addressed to the communicant identifier associated with the user of the instant messaging application, of the second response message and the second data object response including the at least one second image: display, via the instant messaging interface, the at least one second image; and causing storage of the at least portion of the instant messaging application.

In other embodiments, other methods and/or non-transitory media are provided which may omit one or more of the features disclosed in the above embodiment.

In other embodiments, methods and systems are described for constraining a data exchange requested in a communication. In one aspect, the method includes receiving, by a second communications agent that represents a second user and that operates in a second execution environment, constraint information identifying a construction constraint. The method further includes sending, via a network according to a first communication protocol by the second communications agent to a first communications agent that operates in a first execution environment and that represents a first user, a first message including a constraint notification identifying the construction constraint. The method still further includes receiving, via the network by the second communications agent, a second message from the first communications agent. The method additionally includes detecting, in the first message by the second communications agent, a data object request constrained based on the construction constraint. The method also includes initiating an operation to locate a data object, that meets the construction constraint, in a data store in the second execution environment based on the data object request. Performing at least one the preceding actions comprising the method includes execution of an instruction by a processor.

Also, a system for constraining a data exchange requested in a communication is described that includes one or more processors and logic encoded in one or more tangible media to execute by the one or more processors that when executed is operable for receiving, by a second communications agent that represents a second user and that operates in a second execution environment, constraint information identifying a construction constraint; sending, via a network according to a first communication protocol by the second communications agent to a first communications agent that operates in a first execution environment and that represents a first user, a first message including a constraint notification identifying the construction constraint; receiving, via the network by the second communications agent, a second message from the first communications agent; detecting, in the first message by the second communications agent, a data object request constrained based on the construction constraint; and initiating an operation to locate a data object, that meets the construction constraint, in a data store in the second execution environment based on the data object request.

Further, a system for constraining a data exchange requested in a communication is described. The system includes a constraint handler component for receiving, by a second communications agent that represents a second user and that operates in a second execution environment, constraint information identifying a construction constraint. The system further includes a constraint notification constructor component for sending, via a network according to a first communication protocol by the second communications agent to a first communications agent that operates in a first execution environment and that represents a first user, a first message including a constraint notification identifying the construction constraint. The system still further includes a content manager component for receiving, via the network by the second communications agent, a second message from the first communications agent. The system additionally includes a query handler component for, detecting, in the first message by the second communications agent, a data object request constrained based on the construction constraint. The system also includes a query director component for, initiating an operation to locate a data object, that meets the construction constraint, in a data store in the second execution environment based on the data object request. The system also includes a processor, wherein at least one of the constraint handler component, the constraint notification constructor component, the content manager component, the query handler component, and the query director component includes an instruction that is executed by the processor during operation of the system.

Methods and systems are described for constraining a data exchange requested in a communication. In one aspect, the method includes receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network. The method further includes generating, by the first communications agent and based on the construction constraint, a data object request to identify a data object in a second data store of the second execution environment. The method still further includes sending, via the network to the second communications agent, a second message including the data object request. The method additionally includes receiving, by the first communications agent in response to sending the data object request, a third message that includes a data object response, constrained based on the construction constraint, that identifies the data object. Performing at least one the preceding actions comprising the method includes execution of an instruction by a processor.

Also, a system for constraining a data exchange requested in a communication is described that includes one or more processors and logic encoded in one or more tangible media to execute by the one or more processors that when executed is operable for receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network; generating, by the first communications agent and based on the construction constraint, a data object request to identify a data object in a second data store of the second execution environment; sending, via the network to the second communications agent, a second message including the data object request; and receiving, by the first communications agent in response to sending the data object request, a third message that includes a data object response, constrained based on the construction constraint, that identifies the data object.

Further, a system for constraining a data exchange requested in a communication is described. The system includes a content manager component for receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network. The system further includes a constraint content component for generating, by the first communications agent and based on the construction constraint, a data object request to identify a data object in a second data store of the second execution environment. The system still further includes a request constructor component for sending, via the network to the second communications agent, a second message including the data object request. The system additionally includes a result handler component for, receiving, by the first communications agent in response to sending the data object request, a third message that includes a data object response, constrained based on the construction constraint, that identifies the data object. The system also includes a processor, wherein at least one of the content manager component, the constraint content component, the request constructor component, and the result handler component includes an instruction that is executed by the processor during operation of the system.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 8A illustrates an exemplary portion of a communication between a first execution environment and a second execution environment according to an aspect of the subject matter described herein; and FIG. 8B illustrates another exemplary portion of a communication between a first execution environment and a second execution environment according to an aspect of the subject matter described herein.

DETAILED DESCRIPTION

Figure 1:
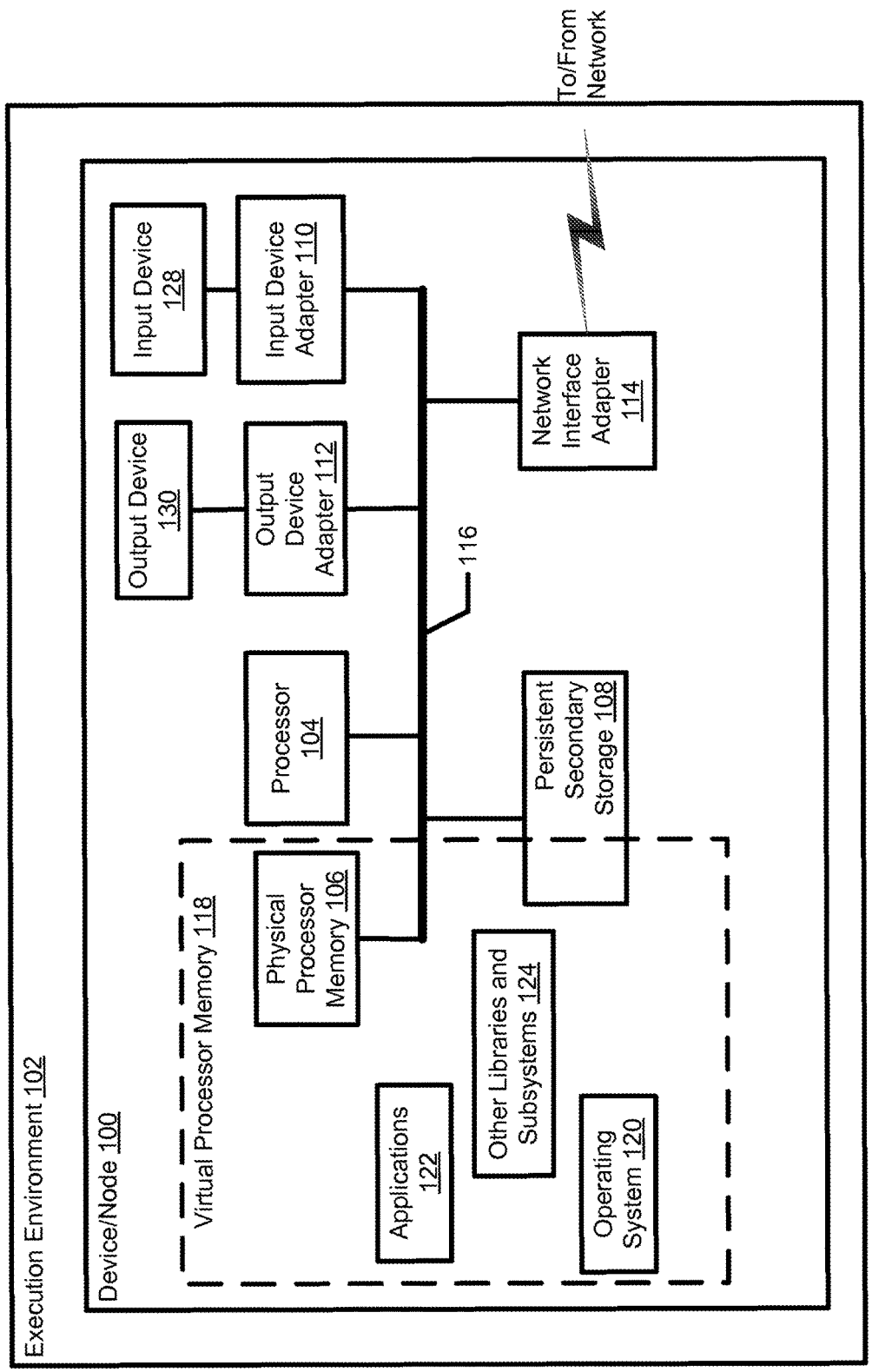
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present specification, including definitions, will control. In addition, the materials, methods, and examples are illustrative only and not intended to be limiting.

An exemplary device included in an execution environment that may be configured according to the subject matter is illustrated in FIG. 1. An "execution environment", as used herein, is an arrangement of hardware and, in some aspects, software that may be further configured to include and/or otherwise host an arrangement of components to perform a method of the subject matter described herein. An execution environment includes and/or is otherwise provided by one or more devices. The execution environment is said to be the execution environment of the device and/or devices. An execution environment may be and/or may include a virtual execution environment including software components operating in a host execution environment. Exemplary devices included in and/or otherwise providing suitable execution environments to configure according to the subject matter include personal computers, notebook computers, tablet computers, servers, portable electronic devices, handheld electronic devices, mobile devices, multiprocessor devices, distributed systems, consumer electronic devices, routers, communication servers, and/or any other suitable devices. Those skilled in the art will understand that the components illustrated in FIG. 1 are exemplary and may vary by particular execution environment.

FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter to present information to a user; a network interface component, illustrated by a network interface adapter 114, to communicate via a network such as a LAN and/or WAN; and a communication mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs). Processor 104 may access machine code instructions and data via one or more memory address spaces in addition to the physical memory address space. A memory address space includes addresses identifying locations in a processor memory. The addresses in a memory address space are included in defining a processor memory. Processor 104 may have more than one processor memory. Thus, processor 104 may have more than one memory address space. Processor 104 may access a location in a processor memory by processing an address identifying the location. The processed address may be identified by an operand of a machine code instruction and/or may be identified by a register or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. An address space to identify locations in a virtual processor memory is referred to as a virtual memory address space; its addresses are referred to as virtual memory addresses; and its processor memory is referred to as a virtual processor memory or virtual memory. The term "processor memory" may refer to physical processor memory, such as processor memory 106, and/or may refer to virtual processor memory, such as virtual processor memory 118, depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), RAMBUS DRAM (RDRAM), and/or XDR™ DRAM. Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated tangible computer readable storage media provide volatile and/or nonvolatile storage for computer-readable instructions, data structures, program components, and other data to execute environment 102.

Execution environment 102 may include software components stored in persistent secondary storage 108, in remote storage accessible via a network, and/or in a processor memory. FIG. 1 illustrates execution environment 102 including an operating system 120, one or more applications 122, and other program code and/or data components illustrated by other libraries and subsystems 124. In an aspect, some or all software components may be stored in locations accessible to processor 104 in a shared memory address space shared by the software components. The software components accessed via the shared memory address space are stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Software components typically include instructions executed by processor 104 in a computing context referred to as a "process". A process may include one or more "threads". A "thread" includes a sequence of instructions executed by processor 104 in a computing sub-context of a process. The terms "thread" and "process" may be used interchangeably herein when a process includes only one thread.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. The terms "communication interface component" and "network interface component" are used interchangeably herein. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component to operatively couple the device to a network. Further, the terms "device" and "node" used herein may refer to one or more devices and nodes, respectively, providing and/or otherwise included in an execution environment unless clearly indicated otherwise.

The user-detectable outputs of a user interface are generically referred to herein as "user interface elements" or abbreviated as "UI elements". More specifically, visual outputs of a user interface are referred to herein as "visual interface elements". A visual interface element may be a visual output of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual output", and "visual interface element" are used interchangeably in this document. Other types of UI elements include audio outputs referred to as "audio interface elements", tactile outputs referred to as "tactile interface elements", and the like.

A "user interface (UI) element handler" component, as the term is used herein, includes a component of configured to send information representing a program entity to present a user-detectable representation of the program entity by an output device, such as a display. A "program entity" is an object included in and/or otherwise processed by an application or executable. The user-detectable representation is presented based on the sent information. Information that represents a program entity to present a user detectable representation of the program entity by an output device is referred to herein as "presentation information". Presentation information may include and/or may otherwise identify data in one or more formats. Exemplary formats include image formats such as raw pixel data, JPEG, video formats such as MP4, markup language data such as hypertext markup language (HTML) and other XML-based markup, a bit map, and/or instructions such as those defined by various script languages, byte code, and/or machine code. For example, a web page received by a user agent from a remote application provider may include HTML, ECMAScript, and/or byte code to present one or more UI elements included in a user interface of the remote application. Components configured to send information representing one or more program entities to present particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided to store presentation information, which may include audio, visual, tactile, and/or other sensory data for presentation by and/or on an output device. For example, a buffer to store an image and/or text string may be a presentation space as sensory information for a user. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the terms "program" and "executable" refer to any data representation that may be translated into a set of machine code instructions and may optionally include associated program data. The terms are used interchangeably herein. Program representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. As used herein, the terms "application", and "service" may be realized in one or more executables and/or in one or more hardware components. The terms are used interchangeably herein.

As used herein, the term "network protocol" refers to a formal set of rules, conventions and data structures that governs how computers and other network devices exchange information over a network. The rules, conventions, and data structures are said to be specified or defined in a specification and/or schema.

The term "network path" as used herein refers to a sequence of nodes in a network that are communicatively coupled to transmit data in one or more data units of a specified network protocol between a pair of nodes in the network.

A "data unit", as the term is used herein, is a data entity specified according to a network protocol to transmit data between a pair of nodes in a network path to send the data in and/or otherwise identified by the data unit from a source node to a destination node that includes a protocol endpoint of the network protocol. A network protocol explicitly and/or implicitly specifies and/or otherwise identifies a schema that defines one or more of a format for a valid data unit and a vocabulary for content of a valid data unit. One example of a data unit is an Internet Protocol (IP) packet. The Internet Protocol defines a format for an IP packet that defines a header to identify a destination address that identifies a destination node and a payload portion to include a representation of data to be delivered to the identified destination node. The terms "data unit", "data packet", and "packet" are used interchangeably herein. One or more data units of a first network protocol may transmit a message of second network protocol. For example, one or more data units of the IP protocol may include a TCP message. In another example, one or more TCP data units may transmit an HTTP message.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the protocol. For example 192.168.1.1 is an IP protocol address represented in a human readable format that may be included in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

An "interaction", as the term is used herein, refers to any activity including a user and an object where the object is a source of sensory data detected by the user. In an interaction the user directs attention to the object. An interaction may also include the object as a target of input from the user. The input from the user may be provided intentionally or unintentionally by the user. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input component of the portable electronic device exemplifies the device, as an input target, receiving input from the user. Note that the user in providing input is detecting sensory information from the portable electronic device provided that the user directs sufficient attention to be aware of the sensory information and provided that no disabilities prevent the user from processing the sensory information. An interaction may include an input from the user that is detected and/or otherwise sensed by the device. An interaction may include sensory information that is detected by a user included in the interaction that is presented by an output device included in the interaction.

As used herein "interaction information" refers to any information that identifies an interaction and/or otherwise provides data about an interaction between a user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction. The term "operational component" of a device, as used herein, refers to a component included in performing an operation by the device.

Interaction information for one object may include and/or otherwise identify interaction information for another object. For example, a motion detector may detect user's head turn in the direction of a display of a portable electronic device. Interaction information identifying the user's head is facing the display may be received and/or used as interaction information for the portable electronic device indicating the user is receiving visual input from the display. The interaction information may serve to indicate a lack of user interaction with one or more other objects in directions from the user different than the detected direction, such as a person approaching the user from behind the user. Thus the interaction information may serve as interaction information for one or more different objects.

As used herein, any reference to an entity "in" an association is equivalent to describing the object as "identified" by the association, unless explicitly indicated otherwise.

As used herein, the term "communication" refers to information such as a data unit or message sent, received, to receive, and/or to send via a network between communicants via one or more communications protocols. The data may include text data, audio data, and/or image data. The term "communications agent" refers to a component or application that operates in an execution environment to send data to and/or receive data from another communications agent in a communication, on behalf of the represented communicant, according to a communications protocol via a network. A "communications protocol" defines and/or otherwise identifies an address space including communications addresses to deliver data sent in a communication from one communications agent to another. A communications protocol is a type of network protocol, as defined above. The term "communicant" that interacts with a communications agent to send and/or receive data in a communication. A communicant is identified in a communication by a "communications address" which is included in an address space of a communications protocol for transmitting data in the communication. A communicant is said to be represented by a communications agent that sends and/or receives data in a communication on behalf of the communicant. A communication may include a communicant message. As used herein a "communicant message" refers to data received as input by a communications agent from a sending communicant delivered and/or to be delivered another communications agent to present to another communicant identified by a communications address in the communication. Examples of communicant messages included text data input for an email and/or an instant message, voice data and/or video data received by a communications agent detected via interaction with a communicant via a microphone and/or a camera. To be clear attachments, message headers, communication session control data, and/or connection data for setup and management are not communicant messages as defined herein.

The term "communicant alias" as used herein refers to an identifier of a communicant in a communication where the communicant alias is not a communications address included in an address space of a communications protocol to send and/or receiving data in the communication.

The terms "contactor" and "contactee" identify roles of communicants in a communication. A "contactor" provides information to identify a "contactee" in a communication. A contactee may be included in a communication by a contactor and/or the contactor's communications agent. A contactor and/or a contactee are roles of a user or communicant of a communications agent and may played by a living being, a node, a component, and/or an application.

The term "attachment" as used herein refers to a portion of a communication that includes data from one communicant that is not included in a communicant message portion of the communication. An attachment may be stored and/or otherwise represented in a file system and/or other data store in an execution environment that includes a communications agent included in exchanging the attachment in the communication. A resource sent as an attachment is data that is typically not presented "inline" or in a communicant message. Email attachments are perhaps the most widely known attachments included in communications. An email attachment is a file or other resource sent along with an email in a portion of the email separate from a message portion. As defined, other types of text communications as well as voice and video communications may include attachments. A communication may include one or more resources as one or more attachments.

The term "data object" as used herein refers to any data that is includable and/or otherwise identifiable, based on a data object request, in a data object response Exemplary data objects include files and folders or portions thereof and/or any data that may be included in an attachment in a communication. Data objects may be included as attachments in a communication.

The term "construction constraint" as used herein refers to a constraint that restricts data objects that are identifiable to first user in a response to a request sent in a communication from a communications agent that represents the first user to a communications agent that represents a second user. A construction constraint restricts the construction of the request, referred to herein as a data object request and/or restricts the construction of the response given one or more data objects located based on a corresponding data object request. Construction of a data object request includes receiving and/or identifying data for performing at least part of the construction. An analogous statement applies to the construction of a data object response. A construction constraint is separate from authentication of the first user and separate from role-based or permission-based accessed control that is based on a role, user identify, and/or group membership of the first user. The communication is sent via a communications protocol.

Figure 2A:
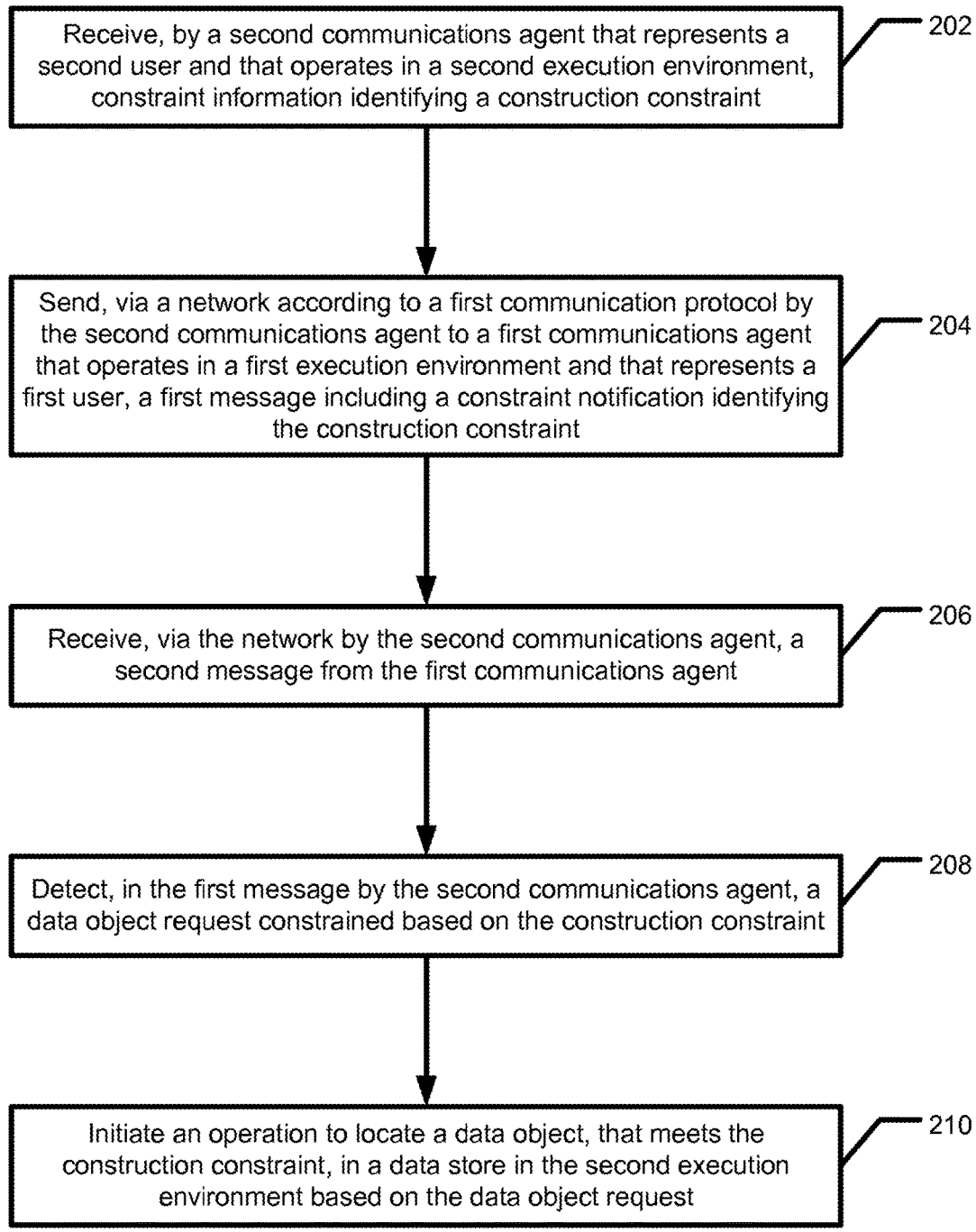
FIG. 2A is a flow diagram illustrating a method for constraining a data exchange requested in a communication according to an aspect of the subject matter described herein.
Figure 2B:
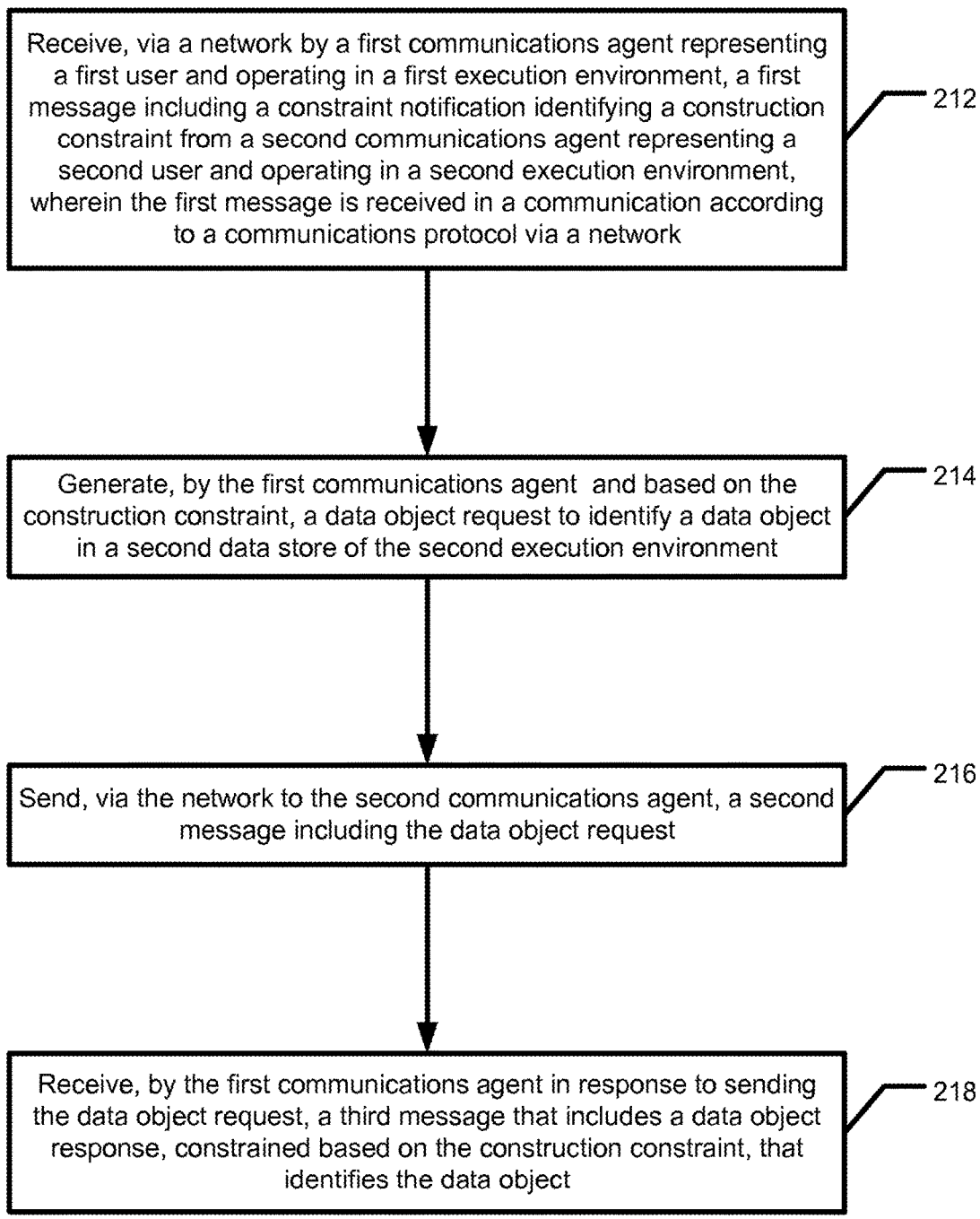
FIG. 2B is a flow diagram illustrating a method for constraining a data exchange requested in a communication according to an aspect of the subject matter described herein.
Figure 3A:
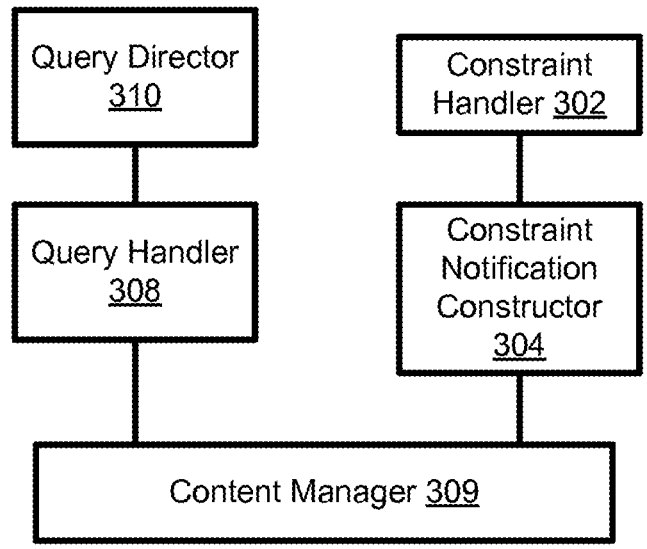
FIG. 3A is a block diagram illustrating an arrangement of components for constraining a data exchange requested in a communication according to another aspect of the subject matter described herein.
Figure 3B:
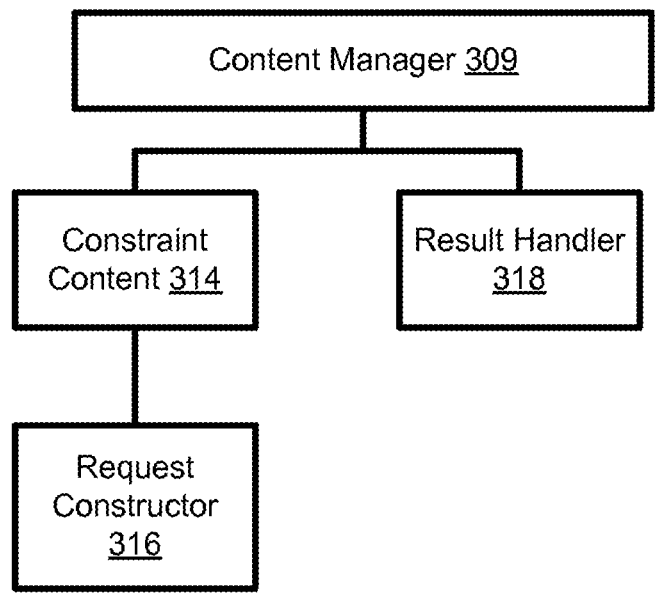
FIG. 3B is a block diagram illustrating an arrangement of components for constraining a data exchange requested in a communication according to another aspect of the subject matter described herein.

FIG. 3A illustrates an arrangement of components in a system that operates in an execution environment, such as execution environment 102 in FIG. 1. The arrangement of components in the system operates to perform the method illustrated in FIG. 2A. The system illustrated includes a constraint handler component 302, a constraint notification constructor (CNC) component 304, a content manager component 306, a query handler component 308, and a query director component 310. A suitable execution environment includes a processor, such as processor 104, to process an instruction in at least one of a constraint handler component, a constraint notification constructor component, a content manager component, a query handler component, and a query director component. FIG. 3B illustrates an arrangement of components in a system that operates to perform the method illustrated in FIG. 2B. The system illustrated includes a content manager component 309, a constraint content (CC) component 314, an request constructor (RC) component 316, and a result handler component 318. A suitable execution environment includes a processor, such as processor 104, to process an instruction in at least one of a content manager component, a constraint content component, a request constructor component, and a result handler component.

Some components, illustrated in the drawings are identified by numbers with an alphanumeric suffix. A component may be referred to generically in the singular or the plural by dropping a suffix of a portion thereof of the component's identifier. For example, window UI elements, such as a window UI element 602*a* in FIG. 6A, a window UI element 602*b* in FIG. 6B, and their adaptations and analogs; are referred to herein generically as a window UI element 602 or window UI elements 602 when describing more than one. Other components identified with an alphanumeric suffix may be referred to generically or as a group in a similar manner.

Figure 4:
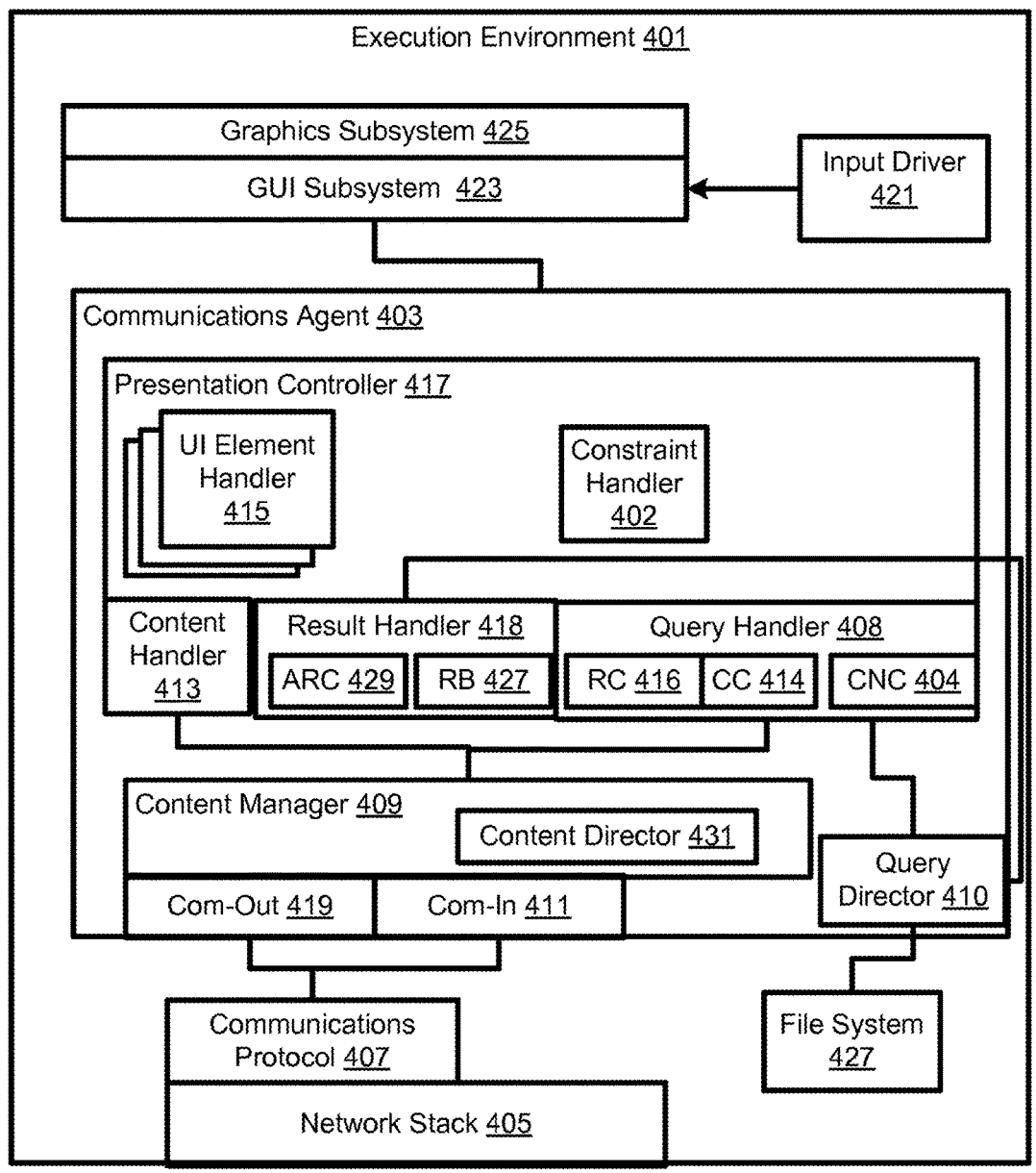
FIG. 4 is a block diagram illustrating an arrangement of components for constraining a data exchange requested in a communication according to another aspect of the subject matter described herein.

The arrangement components illustrated in FIG. 4 may be adapted to operate in a number of execution environments to perform the method illustrated in FIG. 2A and/or the method illustrated in FIG. 2B. FIG. 4 is a block diagram illustrating the components of FIG. 3A, FIG. 3B, and/or analogs of the components of FIG. 3A and FIG. 3B, respectively adapted to operate in an execution environment 401 that includes and/or otherwise is provided by one or more nodes. FIG. 1 illustrates key components of an exemplary device that may at least partially provide and/or otherwise be included in an execution environment. The components illustrated in FIG. 4 may be included in or otherwise combined with the components of FIG. 1 to create a variety of arrangements of components according to the subject matter described herein.

As stated, the various adaptations of the arrangement in FIG. 3A as well as the various adaptations of the arrangement in FIG. 3B illustrated and described herein are not exhaustive. For example, those skilled in the art will see, based on the description herein, that arrangements of components to perform the method illustrated in FIG. 2A and the method illustrated in FIG. 2B may each be distributed across more than one node and/or execution environment. For example, such an arrangement may operate at least partially in a browser in a one node and at least partially in a server in another node interoperating via a network.

Figure 5:
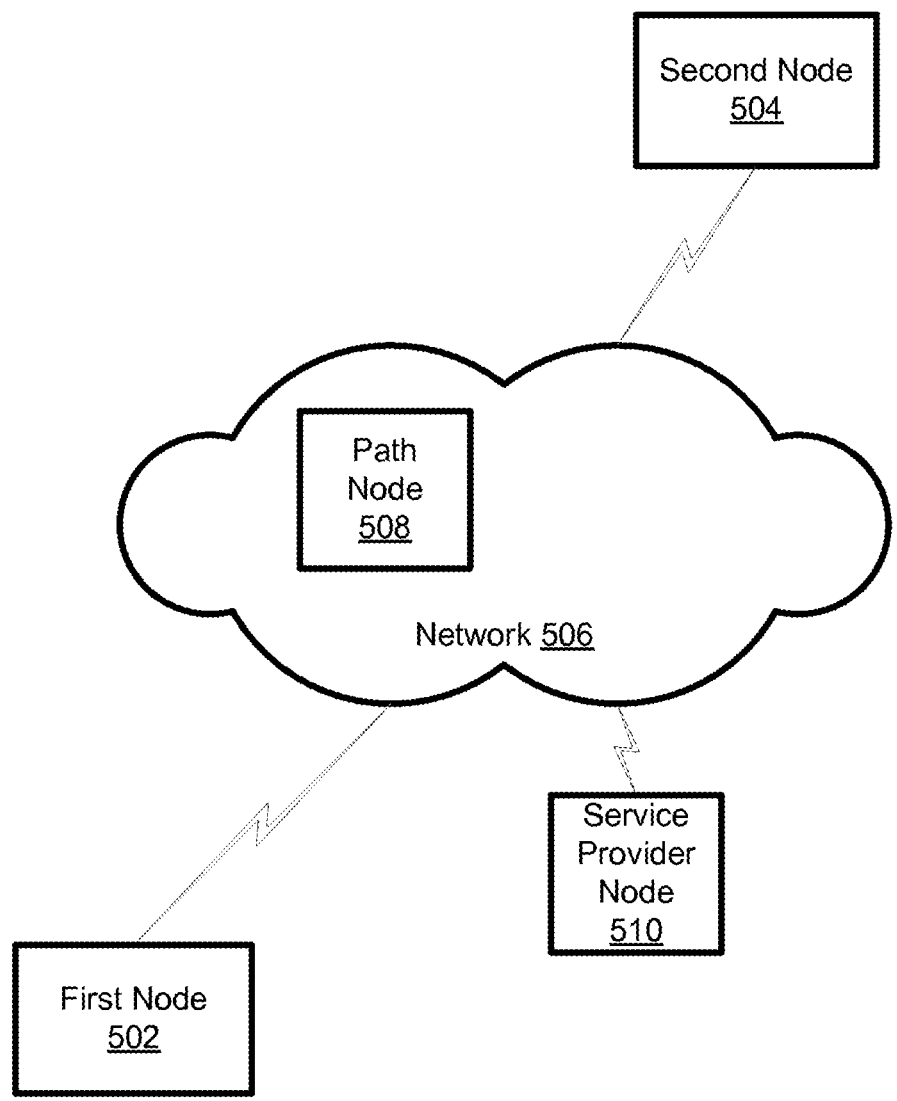
FIG. 5 is a network diagram illustrating a system for constraining a data exchange requested in a communication according to another aspect of the subject matter described herein.

FIG. 5 illustrates a first node 502 and a second node 504 as exemplary devices that each may be included in and/or otherwise adapted to provide an instance, adaptation, and/or analog of execution environment 401 in FIG. 4. As illustrated in FIG. 5, first node 502 and second node 504 are operatively coupled to a network 506 via respective network interface components enabling an execution environment 401 of first node 502 and an execution environment 401 of second node 504 to exchange data in a communication on behalf of communicants represented by the respective nodes.

FIG. 4 illustrates communications agent 403 including an adaptation of the arrangement of components in FIG. 3A and an adaptation of the arrangement of components in FIG. 3B. A first communications agent 403 may operate, in execution environment 401 of first node 502, on behalf of a first communicant to communicate with a second communicant represented by a second communications agent 403 operating in execution environment 401 of second node 504.

Execution environment 401 is illustrated in FIG. 4 hosting communications agent 403. Components in FIG. 4 are referenced for illustrative purposes in describing communications agents operating in execution environment 401 of first node 502 and in describing communications agents operating in execution environment 401 of second node 504. Exemplary communications agents include email clients, phone clients including Voice over Internet Protocol (VoIP) clients, instant messaging clients, short message service (SMS) clients, multimedia message service (MMS clients), multi-media communications clients including video phone clients, and other communications agents.

Communications agents 403 in FIG. 4, respectively operating in execution environment 401 of first node 502 and in execution environment 401 of second node 504 in FIG. 5 may interoperate via respective network stacks 405. Communications agents 403 may communicate via one or more communications protocols. FIG. 4 illustrates communications protocol component 407 exemplifying a subsystem to exchange data via network 506 according to one or more communications protocols, such as simple mail transfer protocol (SMTP), an instant messaging protocol, and/or a real-time voice and/or video protocol. A communication between communications agents 403 in execution environment 401 of first node 502 and execution environment 401 of second node 504 may include more than one type of data and may use one or more communications protocols in exchanging one or more types of data via network 506.

Instances, adaptations, and/or analogs of communications agent 403 in FIG. 4, in execution environment 401 of first node 502 and in execution environment 401 of second node 504, respectively, may communicate via discrete messages, a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, and/or a secure protocol, to name a few communications options.

FIG. 4 illustrates communications agent 403 including a content manager component 409. Content manager component 409 may interoperate with communications protocol layer component 407 and/or network stack 405 to receive data in one or more communications via network 506 in FIG. 5 with another communications agent in another execution environment and/or node. Content manager component 409 is operatively coupled, via com-in component 411, to communications protocol component 407 to receive the data from the other node.

Data received in a communication may include one or more resources and/or content types. Exemplary content types include plain text, markup such as hypertext markup language (HTML), audio data, image data, and/or executable data. Executable data may include script instruction(s), byte code, and/or machine code. In FIG. 4, communications agent 403 includes one or more content handler components 413 to process data received according to its content type. A data type may be identified by a MIME type identifier and/or a file type extension, for example. Exemplary content handler components 413 include a text/html content handler component to process HTML representations; an application/xmpp-xml content handler component to process extensible messaging and presence protocol (XMPP) streams including presence tuples, instant messages, and audio content handlers including and/or configured to retrieve suitable codices; one or more video content handler components to process video representations of various types; and still image data content handler components to process various image data representations.

Content handler component(s) 413 process received data representations and may provide transformed data from the representations to one or more user interface element handler components 415. One or more user interface element handler components 415 are illustrated in a presentation controller component 417 in FIG. 4. Presentation controller component 417 may manage visual, audio, and other types of output for its including application as well as receive and route detected user and other inputs to components and extensions of its including application, communications agent 403. A user interface element handler component 415 may be adapted to operate at least partially in a content handler component 413 such as a text/html content handler component and/or a script content handler component. Additionally or alternatively, a user interface element handler component in an execution environment 401 may be received in a communication. For example, a communication, such as an email, may include an HTML content type portion and a script content type portion.

FIGS. 6A-G illustrate various communications agent windows 602 presentable in a presentation space of a display device, such as output device 130 in FIG. 1. A communications agent window 602 includes a contactor user interface (UI) element 604 to present an identifier of a communicant in the role of a contactor in a communication represented by the communications agent window 602. A communications agent window 602 also includes a contactee UI element 606 to present one or more contactee identifier(s) identifying one or more communicants in the role of contactee(s) included in the communication. A presentation space 608 is provided by a communications agent window 602 to present a communicant message UI element 610 to present a message addressed to one or more contactees identified in a contactee UI element 606. A presentation space 608 may also be provided to present one or more UI controls to exchange data in and/or otherwise manage a communication. A send UI element 612 illustrates an exemplary UI element that may correspond to user input to send data in a communication to one or more identified contactees.

Data to send in a communication to a communications agent in execution environment 401 of second node 504 may be received by one or more content handler component(s) 413 operating in execution environment 401 of first node 502 to transform the data into one or more data representations suitable to transmit in the communication and/or suitable to process by the communications agent 403 in execution environment 401 of second node 504. The one or more data representations may be provided to content manager component 409 to send in the communication to execution environment 401 of second node 504. Content manager component 409 may package and/or otherwise prepare for packaging the one or more data representations in a data unit or message formatted according to a communications protocol of the communications agent 403. Communications protocol component 407 may send the data according to the specification(s) of the communications protocol. Content manager component 409 may alternatively or additionally encode and/or otherwise transform one or more of the data representations to send in a data stream such as voice stream and/or a video stream to communicate in the communication to a communications agent via a network.

Content manager component 409 operating in execution environment 401 included in and/or otherwise provided by first node 502 may provide the packaged, encoded, and/or transformed data to communications protocol component 407 via a com-out component 419. Com-out component 419, as described above, operatively couples communications agent 409 to communications protocol component 407 according to an interface provided by communications protocol component 407 to send data in a communication according to a communications protocol. Communications protocol component 407 may further package and/or otherwise transform the data to send via network stack 405 to deliver via network 506 to execution environment 401 of second node 504.

As described above, a communications protocol may operate via one or more nodes in a network in a network path including first node 502 and second node 504. Exemplary path nodes include mail relay nodes, phone switch nodes, and proxy nodes such as instant messaging proxies to communicate through firewalls. As indicated, path node 508 illustrates such a node.

Sending data in a communication requires identifying a contactee. A contactee may be represented by a communications address in an address space of a communications protocol. In one aspect, information identifying a communications address may be received from a communicant of a communications agent in an execution environment node. In FIG. 4, presentation controller 417 and/or a UI element handler 415, presenting and/or managing interaction with contactor UI element 604 in FIG. 6A for execution environment 401 of first node 502, may receive a contactor alias in response to a user input corresponding to UI element handler 604. The user of execution environment 401 of first node 502 may enter a contactor alias, such as "Dad", via a keyboard and/or may select a predefined communicant alias presented in a selection UI control element via a UI element handler component 415. The user input may be detected by input driver 421. Corresponding input information may be routed to presentation controller 417 by GUI subsystem 423. GUI subsystem 423 may send presentation information to a display device via a graphics subsystem 425. Communications agent 403 may identify a communication address associated with the contactor alias, "Dad". Other communications address, such as for one or more contactees, may be received similarly and/or in any suitable manner.

Data may be sent in a communication according to a form or type of the communication and/or other attribute of the communication such as a security attribute, the amount of data to be sent, a priority setting, a task setting, and the like. Some forms of communication do not require a session and/or connection between an execution environment 401 of first node 502 and an execution environment 401 of second node 504 in order to send data between the two nodes, while others do. An email and/or instant message may use a store and forward model of delivery.

Data may be sent in a communication in response to a communicant input. A contactor may provide an input corresponding to send UI element 612a in FIG. 6A. The input may be received by presentation controller component 417 and/or one or more UI element handlers 415 corresponding to send UI element 612a. In response to detecting the input, presentation controller component 417 may provide data to be sent in the communication to one or more content handler components 413 according to the content type(s) of the data to be sent.

The one or more content handler components 413 may encode, format, and/or otherwise transform the data to send in a message, such as an email message. The one or more content handler components 413 may provide data to be sent to content manager 409, instructing content manager component 409 to send the data in the communication to deliver to a communications agent in execution environment 401 of second node 504. Content manager component 409 interoperating with com-out component 419 may further format and/or transform the data to send in the communication according to a communications protocol, for example according to an email communications protocol, by communications protocol component 407. Communications protocol component 407 may send the communication to deliver to the communications agent in execution environment 401 of second node 504 via network 506.

Path node 508 may relay data sent in the communication between execution environment 401 of first node 502 and execution environment 401 of second node 504. Path node 508 may determine a next node and/or a network interface in a network path communicatively coupling execution environment 401 of first node 502 and execution environment 401 of second node 504 to exchange data in a communication between communications agents 403 in the execution environment 401 of first node 502 and in the execution environment 401 of second node 504.

For session-oriented and/or connection-oriented communication a session and/or connection may be established if a session/connection has not already been established. Data may be sent to deliver to a communications agent identified based on a contactee communications address during session and/or connection setup. For example, for a voice communication a voice communication may be established via a session initiation protocol. Communications protocol component 407 may operate according to the session initiation protocol specifications. Communications protocol component 407 operating in execution environment 401 of first node 502 may locate a communications agent by communicating with one or more nodes in network 506 according to the session initiation protocol. Communications protocol component 407 may locate a communications agent in execution environment 401 of second node 504, based on a communications address for the contactee located based on the contactor alias.

Once a communication session is established, such as a voice session, data may be sent according to the session communications protocol, such as RTP. Data may be sent according to a session initiation protocol in the communication to manage the voice communication session and/or to exchange text, image, and/or other data outside of the voice session. Path node 508 may be included in session and/or connection setup. Alternatively or additionally, path node 508 may be included in a network path in a session and/or connection.

With reference to FIG. 2A, a block 202 illustrates that the method includes receiving, by a second communications agent that represents a second user and that operates in a second execution environment, constraint information identifying a construction constraint. Accordingly, a system for constraining a data exchange requested in a communication includes means for receiving, by a second communications agent that represents a second user and that operates in a second execution environment, constraint information identifying a construction constraint. For example, the arrangement in FIG. 3A, includes constraint handler component 302 that is operable for receiving, by a second communications agent that represents a second user and that operates in a second execution environment, constraint information identifying a construction constraint. FIG. 4 illustrates constraint handler component 402 as an adaptation and/or analog of the constraint handler component 302 in FIG. 3A. One or more constraint handler components 402 operate in an execution environment 401. The system for constraining a data exchange requested in a communication includes one or more processors and logic encoded in one or more tangible media to execute by the one or more processors that when executed is operable for receiving, by a second communications agent that represents a second user and that operates in a second execution environment, constraint information identifying a construction constraint. In FIG. 4, constraint handler component 402 is illustrated as a component of communications agent 403.

Figure 7:
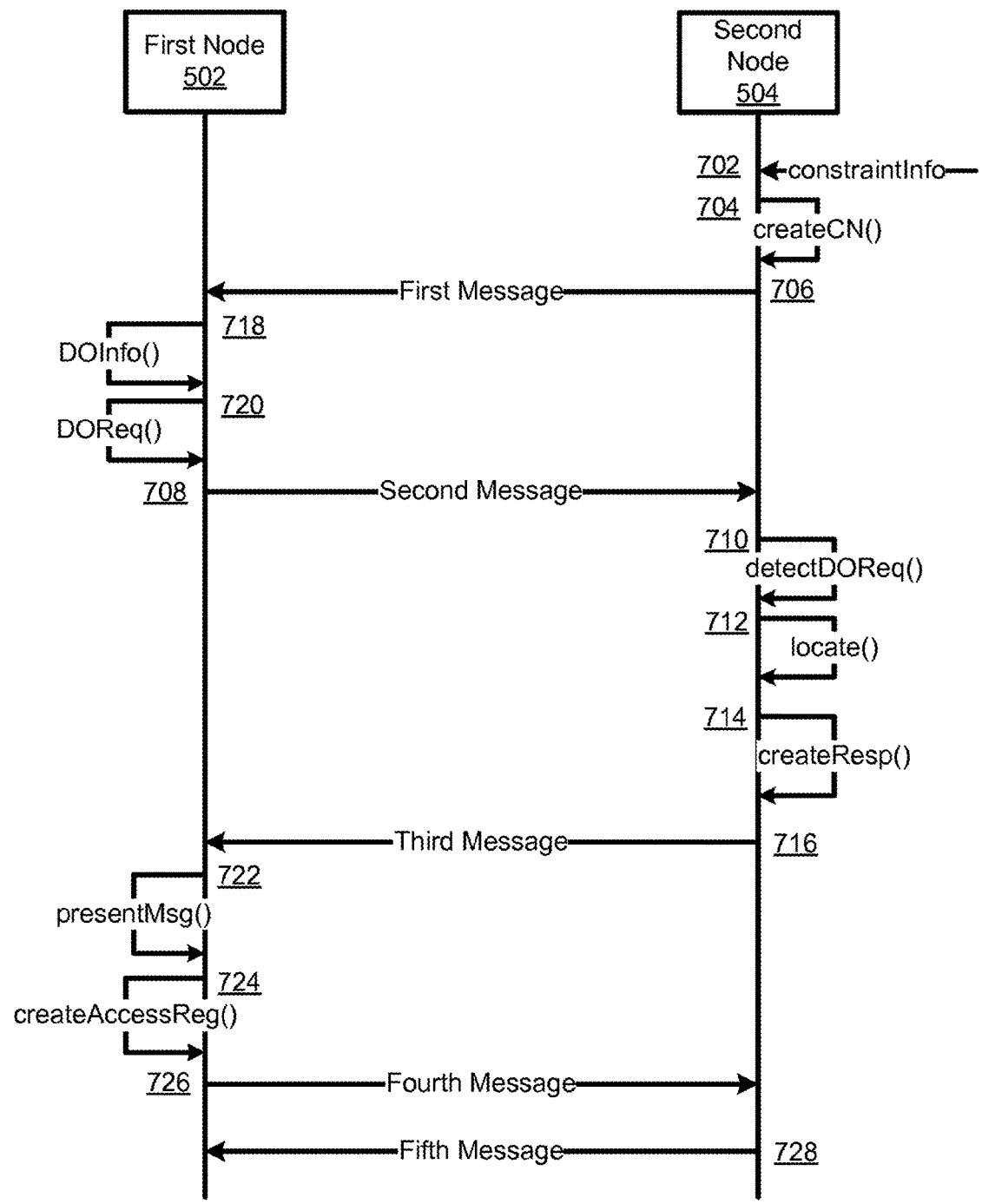
FIG. 7 is a message flow diagram illustrating an exemplary data and execution flow for constraining a data exchange requested in a communication according to an aspect of the subject matter described herein.

FIG. 7 illustrates a constraint information dataflow message 702 that illustrates a data flow internal to execution environment 401 of second node 504 and/or a message received via network 506 by execution environment 401 of second node 504. Constraint information dataflow message 702, included in construction of a constraint notification, may represent constraint information received by a UI element handler component 415 in response to user input. In another aspect, constraint information dataflow message 702 may represent constraint information received by content manager component 409 via network 506 from, for example, a browser operating in a node (not shown) in network 506. FIG. 7, also illustrates, a create constraint notification (createCN) data flow message 704. As with data flow message 702, createCN dataflow message 704 may illustrate a data flow internal to execution environment 401 of second node 504 and/or a message received via network 506 by execution environment 401 of second node 504. CreateCN data flow message 704 may represent a flow of control that provides and/or otherwise identifies constraint information to constraint handler component 402 in execution environment 401 of second node 504. Constraint handler component 402 may process the constraint information to construct a constraint notification.

A constraint handler component may be a type of content handler component that operates to process constraint information to create a constraint notification that conforms to a schema to create and/or otherwise construct a valid constraint notification. Constraint handler component 402 may construct and/or otherwise create a constraint notification based on a schema that defines and/or otherwise identifies a valid constraint notification for a particular type of communication and/or for a particular communications protocol supported by a communications agent. The constraint notification is constructed and/or otherwise created, based on the constraint information, by constraint handler component 402 interoperating with a constraint notification constructor (CNC) component 404. Constraint notification constructor component 404 in execution environment 401 of second node 504 may provide a constraint notification to content manager component 409 to include and/or otherwise identify the constraint notification in a communication with execution environment 401 of first node 502, such as in an email, instant message, and/or voice communication. Content manager component 409 may interoperate with other types of content handler components 413 to create and/or otherwise construct a message that includes the valid constraint notification In an aspect, constraint notification constructor component 404 may interoperate with content manager component 409 to create the valid constraint notification according to a specified schema for a data unit and/or message of a communication protocol of a communications agent 403 in execution environment 401 of second node 504. The constraint notification is built so that the data unit and/or message is valid according to a communications protocol supported by a communications protocol component 407 that operates to send the message. As described above, the content manager component 409 may operate in execution environment 401 of second node 504 along with constraint notification constructor component 404 to transform constraint information into a constraint notification to include along with data for other parts of a communication into one or more data representations suitable to transmit in the communication to another node, such as execution environment 401 of first node 502. Some or all of the representations transmitted are suitable to process by the communications agent 403 in execution environment 401 of first node 502. Content manager component 409 in execution environment 401 of second node 504 may package the one or more data representations including a representation of the constraint notification into a data unit and/or message formatted according to the communications protocol.

In an aspect, constraint information may identify a construction constraint by identifying a data object request schema that defines at least one of a vocabulary and a rule that constrains the construction of the data object request. In FIG. 8A, a portion of an email communication 800a is illustrated formatted as a multipart/mixed content type including constraint notification 802a. A constraint notification may be identified in a communication based on a reserved keyword identifier. In FIG. 8A, a content header assigned the name "CONTENT-QUERY-SCHEMA" may be defined to identify a URL for accessing a schema that constrains a data object request.

Alternatively or additionally, a constraint notification may identify some or all of a form to present to a user in receiving data object information to construct a data object request. The data object request may constrained based on the form or portion thereof. In another aspect, a constraint notification may include a schema and/or some or all of a form to constrain a data object request and/or to constrain processing of a data object request. A construction constraint identified by a constraint notification may be represented, at least in part, by a representation of an instruction that is valid according to a programming language. The programming language may be a scripting language. The instruction may be included in enforcing the construction constraint at least partially identified by a form.

Constraint notification 802a, in FIG. 8a, may also be identified by its location in the portion of the email 800a. For example, content headers are located in specified areas of valid emails. Alternatively or additionally a constraint notification may be detected and/or otherwise identified in a data unit and/or message or a communications protocol based on an identifier or markup element, such as a MIME type identifier and/or a file name extension. A constraint notification be detected based on content included in the message and/or based on metadata such as a "QUERY-ACCEPT" content header 802b, in FIG. 8B, a constrain notification is identified by a MIME type identifier, such as "application/id-request", which may be defined to represent one or more matching criteria in a data object request according to a specification for an "id-request" XML document, discussed in more detail below. Constraint notification 802b identifies additional MIME types that may inform a receiving communications agent that a data object request may be valid according to other schemas that may identify similar or different constraints. In constraint notification 802b, a MIME type identifier "application/regex-request" is illustrated that may be defined to identify a schema for a data object request constrained by a regular expression language associated with the application/regex-request MIME type. The examples provided are not exhaustive.

Returning to FIG. 2A, a block 204 illustrates that the method further includes sending, via a network according to a first communication protocol by the second communications agent to a first communications agent that operates in a first execution environment and that represents a first user, a first message including a constraint notification identifying the construction constraint. Accordingly, a system for constraining a data exchange requested in a communication includes means for sending, via a network according to a first communication protocol by the second communications agent to a first communications agent that operates in a first execution environment and that represents a first user, a first message including a constraint notification identifying the construction constraint. For example, the arrangement in FIG. 3A, includes constraint notification constructor component 304 that is operable for sending, via a network according to a first communication protocol by the second communications agent to a first communications agent that operates in a first execution environment and that represents a first user, a first message including a constraint notification identifying the construction constraint. FIG. 4 illustrates constraint notification constructor component 404 as an adaptation and/or analog of constraint notification constructor component 304 in FIG. 3A. One or more constraint notification constructor components 404 operate in an execution environment 401. The system for constraining a data exchange requested in a communication includes one or more processors and logic encoded in one or more tangible media to execute by the one or more processors that when executed is operable for sending, via a network according to a first communication protocol by the second communications agent to a first communications agent that operates in a first execution environment and that represents a first user, a first message including a constraint notification identifying the construction constraint. In FIG. 4, constraint notification constructor component 404 is illustrated as a component of communications agent 403.

FIG. 7 illustrates first message 706, including a constraint notification that identifies a construction constraint, received via network 506 by execution environment 401 of first node 502 from execution environment 401 of second node 504.

A constraint notification generated by an constraint notification constructor component 404, along with a communicant message and any other data to include in a communication, may be provided and/or otherwise identified to content manager component 409 to send in the communication. The content manager component 409 in execution environment 401 of second node 504 may package and/or prepare for packaging the data including a representation of the data object request into the message formatted according to the communications protocol. Com-out component 419 may provide the data object request, the communicant message, and any other data to send in the communication in data representations suitable to send by communications protocol component 407 to the communications agent 409 in execution environment 401 of first node 502. Communications protocol component 407 operating in execution environment 401 of second node 504 may send the data in a communication, according to the specification(s) of the communications protocol. For example, the data may be sent in an email message. Communications protocol component 407 may further package and/or otherwise transform the data to send via network stack 405 to deliver via network 506 to execution environment 401 of first node 502.

Content manager component 409 may alternatively or additionally encode and/or otherwise transform one or more of the data representations to send in a data stream such as voice stream and/or a video stream to communicate in a communication with the communications agent 403 in execution environment 401 of first node 502.

A constraint notification may be included in a data unit or message, such as first message 706, according to a schema that identifies the message as valid according the communications protocol. A constraint notification may be sent in a message separately from a communicant message also in the message. In another aspect, constraint notification may be included in a communicant message, for example, as a form as described above and/or other presentation data. Communications agent 403 in execution environment 401 of second node may send presentation data to communications agent 403 in execution environment 401 of first node, so that a user interface may be presented to a user of execution environment 401 of first node to receive data object information. A data object request may be constructed, as constrained by the presentation data. Communications agent 403 in execution environment 401 of first node may send the data object request to communications agent 403 in execution environment 401 of second node. A constraint notification (and likewise constraint information) may include information for an execution environment to generate and/or otherwise modify a data object request.

A construction constraint, and thus a constraint notification, may identify information to prevent and/or otherwise constrain a data object request and/or a data object response from identifying a data object in a second data store based on at least one of a location of the data object in the second data store, at least a portion of a file name of the data object, at least a portion of a file path of the data object, a file type of the data object, a content type of data included in the data object, at least a portion of the content of the data object, an attribute of the data object that is represented in the second execution environment, an attribute of the data object that is not represented in the second execution environment, a relationship between the data object and at least one of the first user and the second user, communications protocol for exchanging data in a communication, and/or an attribute of a communicant message exchanged between communications agents.

Returning to FIG. 2A, a block 206 illustrates that the method yet further includes receiving, via the network by the second communications agent, a second message from the first communications agent. Accordingly, a system for constraining a data exchange requested in a communication includes means for receiving, via the network by the second communications agent, a second message from the first communications agent. For example, the arrangement in FIG. 3A, includes content manager component 309 that is operable for receiving, via the network by the second communications agent, a second message from the first communications agent. FIG. 4 illustrate content manager components 409 as an adaptations and/or analogs of content manager component 309 in FIG. 3A. One or more content manager components 409 operate in an execution environment 401. The system for constraining a data exchange requested in a communication includes one or more processors and logic encoded in one or more tangible media to execute by the one or more processors that when executed is operable for receiving, via the network by the second communications agent, a second message from the first communications agent. In FIG. 4, a content manager component 409 is illustrated as a component of application 403.

FIG. 7 illustrates second message 708, including a data object request, received via network 506 by execution environment 401 of second node 504 from execution environment 401 of first node 502.

In addition to packaging representations of data in a structure and/or format to send a data unit or message according to a communications protocol, a content manager component 409 may operate to detect a data object request received and/or otherwise identified in a message and/or data unit received in a communication according to a communications protocol. Content manager component 409 operating in execution environment 401 of second node 504 may receive the message, illustrated by second message 708, in a communication with execution environment 401 of first node 502. Com-in component 411 in execution environment 401 of second node 504 may receive the message via communication protocol component 407 and network stack 405. Second message 708 may be delivered to execution environment 401 of second node 504 via network 506 based on a communications address of a communicant represented by communications agent 403 in execution environment 401 of second node 504. A communications agent may represent more than one communicant, which may be identified by different addresses.

The second message 708 in FIG. 7 may be received via network 506 by network stack 405 and communications protocol component 407 in an instance of and/or analog of execution environment 401 including and/or otherwise provided by execution environment 401 of second node 504. The data in the communication may be received by com-in component 411. Com-in component 411 may provide the data to content manager component 409. Content manager component 409 may determine one or more content types of the data. The content and/or portions of the content may be provided to one or more content type handler components 413 based on the one or more content types identified by content manager component 409. For example, FIG. 8A illustrates message portion 814a including "text/plain" MIME type identifier 816a as a content type identifier. Message portion 814a may be provided to a text/plain content handler 413. Audio data in a voice communication may be provided to an audio content handler component 413, and video data in a video communication may be provided to a video content handler component 413.

Returning to FIG. 2A, a block 208 illustrates that the method yet further includes detecting, in the first message by the second communications agent, a data object request constrained based on the construction constraint. Accordingly, a system for constraining a data exchange requested in a communication includes means for detecting, in the first message by the second communications agent, a data object request constrained based on the construction constraint. For example, the arrangement in FIG. 3A, includes query handler component 308 that is operable for detecting, in the first message by the second communications agent, a data object request constrained based on the construction constraint. FIG. 4 illustrates query handler component 408 as an adaptation and/or analog of query handler component 308 in FIG. 3A. One or more query handler components 408 operate in an execution environment 401. The system for constraining a data exchange requested in a communication includes one or more processors and logic encoded in one or more tangible media to execute by the one or more processors that when executed is operable for detecting, in the first message by the second communications agent, a data object request constrained based on the construction constraint. In FIG. 4, a query handler component 408 is illustrated as a component of result handler component 418.

FIG. 7 includes a dataflow message 710 that illustrates a detect data object request (detectDOReq) dataflow that may be internal to execution environment 401 of second node 504 and/or may include interoperation with another execution environment and/or node via a network. With respect to FIG. 4, dataflow message 710, in FIG. 7, may correspond to a data exchange and/or other interoperation between content handler component 409 and query handler component 408 to detect and/or otherwise process the data object request received in second message 708 by execution environment 401 of second node 504. Com-in component 411 in execution environment 401 of second node 504, as described above, provides the message, received from execution environment 401 of first node 502, to content manager component 409. Content manager component 409 is operatively coupled, via com-in component 411, to communications protocol component 407 to receive data in communications with other nodes, such as execution environment 401 of first node 502. Thus, execution environment 401 of second node 504 may receive a message via a com-in component 411 in a communication with execution environment 401 of first node 502. The message may include a data object request based on data object information identified by a user to communications agent 403 in execution environment 401 of first node 502. The data object request, in an aspect may be constrained by the execution environment of first node 502 based on construction constraint received from execution environment 401 of second node 504. Alternatively or additionally, a construction constraint sent and/or otherwise identified to execution environment 401 of first node 502 may be applied in processing a data object request received by communications agent 403 and/or another program component operating in execution environment 401 of the second node 504.

For example, a construction constraint identified by constraint information may be identified and/or otherwise represented by a constraint correlator identified by a constraint notification, such as a constraint notification included in first message 706. Communications agent 403 in execution environment 401 of first node 502 may include the constraint correlator received in first message 706 in second message 708 to send to communications agent 403 in execution environment 401 of first node 504. The constraint correlator may be included in the data object request and/or may be included in second message 708 separately. Communications agent 403 in execution environment 401 of first node 504 may detect constraint correlator in response to receiving the second message. Query handler component 408 in communications agent 403 in execution environment 401 of first node 504 may identify a construction constraint associated with the constraint correlator. Request constructor component 416 may verify that the received data object request meets the construction constraint. Alternatively, one or more of query handler component 408, query directory component 410, result handler component 418, and response builder component 427 may be included in verifying that a data object response sent to execution environment 401 of the first node 502 meets the construction constraint.

Data received in a communication, which may for example include a voice session and/or an instant message, may include data of various content types. In FIG. 4, communications agent 403 in execution environment 401 of second node 504 includes one or more content handler components 413 to process data received according to its content type. Content manager component 409 may detect and/or otherwise identify a portion of the message as the data object request sent from execution environment 401 of first node 502. The data object request may be identified by content manager component 409 according to a schema for the message and/or a schema for the data object request. For example, a portion of the message may include a MIME-type identifier that identifies the portion as a data object request and/or otherwise identifies the portion to route to a query handler component 408 operating in and/or otherwise on behalf of execution environment 401 of second node 504. Alternatively or additionally, the data object request may have structure and/or content that is valid and identifiable according to a schema to define and/or otherwise identify valid data object requests. A query handler component, may be provided as a type of content handler component. Alternatively or additionally, a query handler component may interoperate with one or more content handler components to detect a data object request in a message received by a content manager component.

As such, query handler component 408 may operate along with other content handler components 413 to process data representations received in the second message 708 from execution environment 401 of first node 502. Query handler component 408 may also provide transformed data from the data representations to one or more user interface element handler components 415. Query handler component 408 may operate to validate and process data object requests according to a schema defining valid data object requests. Query handler component 408 may, in an aspect, verify and/or otherwise enforce the construction constraint sent to communications agent 403 in execution environment 401 of the first node 502.

Various portions of a message including a data object request may be provided to one or more content handler components 413, including query handler component 408 to interoperate with presentation controller component 417 in execution environment 401 of second node 504 to present some or all of the received message, including the data object request.

Message portion 800a, in FIG. 8A, illustrates an exemplary portion of data that may be included in second message 708. First message 706, as described, may include a constraint notification that identifies a schema, such as schema for a <id-request> XML document. FIG. 8A illustrates an "application/id-request" MIME type identifier that may be defined to identify a schema for an XML-based language to specify id-request XML documents that when valid meet the constraint. FIG. 8A illustrates id-request document 808a. Id-request document 808a, as illustrated, includes criterion tag elements 810a corresponding to the form elements in the user interface illustrated in FIG. 6A. The form elements, in an aspect, may be presented based on the construction constraint received as described with respect to first message 706 in FIG. 7. A criterion tag element 810a identifies a data object matching criterion name, such as "query" indicating that the criterion is a query expression or a portion thereof. A "type" attribute identifies a schema with the identifier "keyword" for the expression. The criterion tag element 810a identifies a value for a query "Uncle Joe" in a match-expression attribute. Another criterion tag element 810a specifies a scope query specified in the first criterion tag element. FIG. 8A illustrates an "and" tag 812a indicating that all the matching criteria must be met in identifying a data object. An "or" tag (not shown) may be defined by a schema for id-request documents. Other operator elements and operator precedence may be defined by the schema. Grouping elements to manage operator precedence, such as a parenthesis element, may be defined by the schema. Thus, the data object request received in second message 708 is constrained by the construction constraint specified by the <id-request> document schema identified in the constraint notification in first message 706.

Figure 6A:
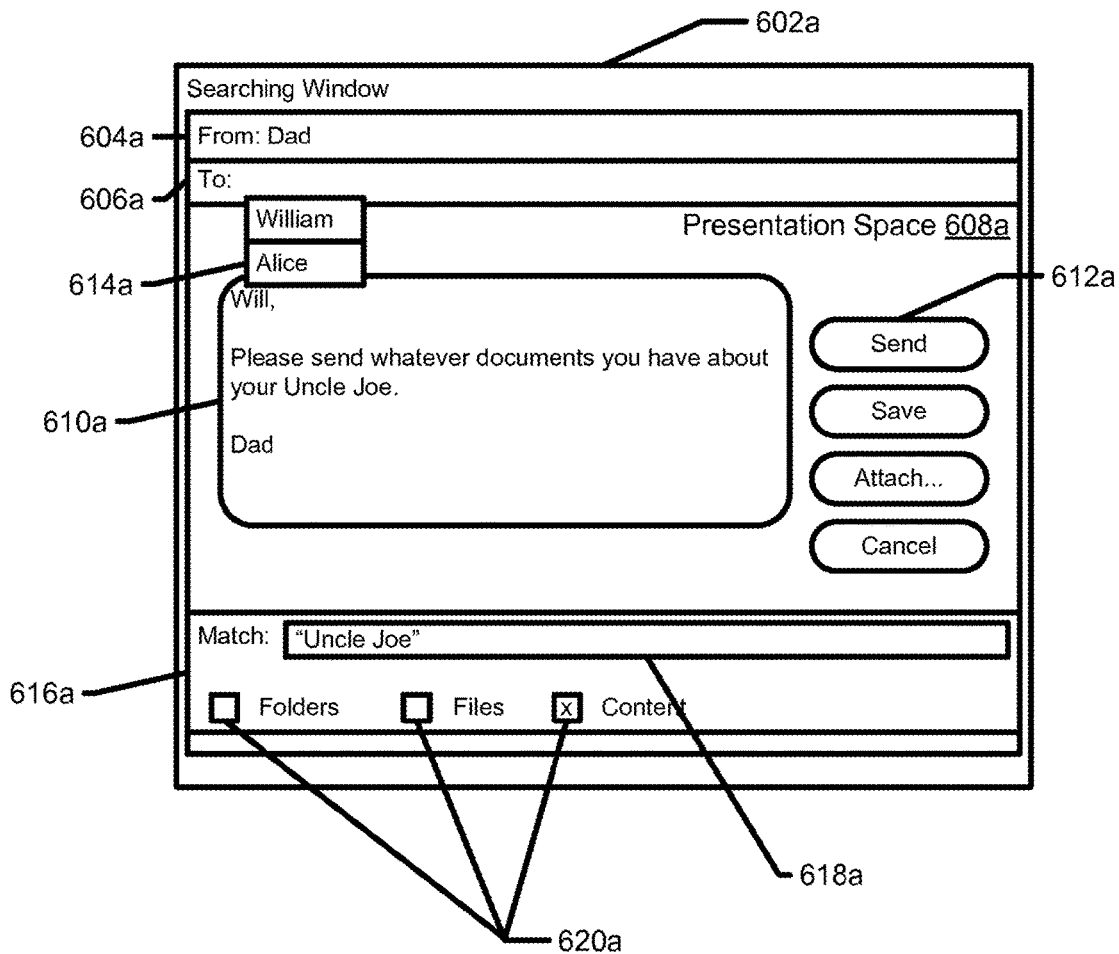
FIG. 6A is a diagram illustrating a user interface presented via a display according to another aspect of the subject matter described herein.

FIG. 6A illustrates an exemplary user interface that may be presented by communications agent 403 operating in execution environment 401 of first node 502 based on the construction constraint specified by the <id-request> document schema. A UI element handler component 415 may operate to present a user interface element to allow a user to identify data object information. A data object information (DOI) UI element 616a is illustrated in FIG. 6A, as an example. The same or different UI element handler component 415 may present various other UI elements included in DOI UI element 616a. DOI UI element 616a and one or more UI elements it includes may be presented by one or more corresponding UI element handler component(s) 415 that may operate based on a schema that defines valid data object information and/or data object requests to include in a communication via a communications agent 403. The schema defines one or more rules and/or a vocabulary that defines whether data object information and/or a data object request is valid. Those skilled in the art will understand that numerous languages and/or schemas to provide data object information and/or data object requests currently exist including relatively simple key word based queries to relatively more complicated regular expression languages and data base query languages, such as various versions of structured query language (SQL). New schemas are and will be created, and are, thus, considered within the scope of the subject matter described herein.

DOI UI element 616a illustrates a user interface for a keyword based schema. Match textbox UI element 618a illustrates a textbox that constrains a user to entering a keyword expression. Various checkbox UI elements 620a constrain a user in defining a scope of a data object request by restricting the user's ability to define a scope based on folders, files, and/or content of files in a file system and/or other data store of a receiving execution environment. A communications agent 403 may support more than one data object request schema and/or corresponding data object information schema. Thus. a communications agent may provide a user interface to receive valid data object information as constrained by each respective schema.

Figure 6B:
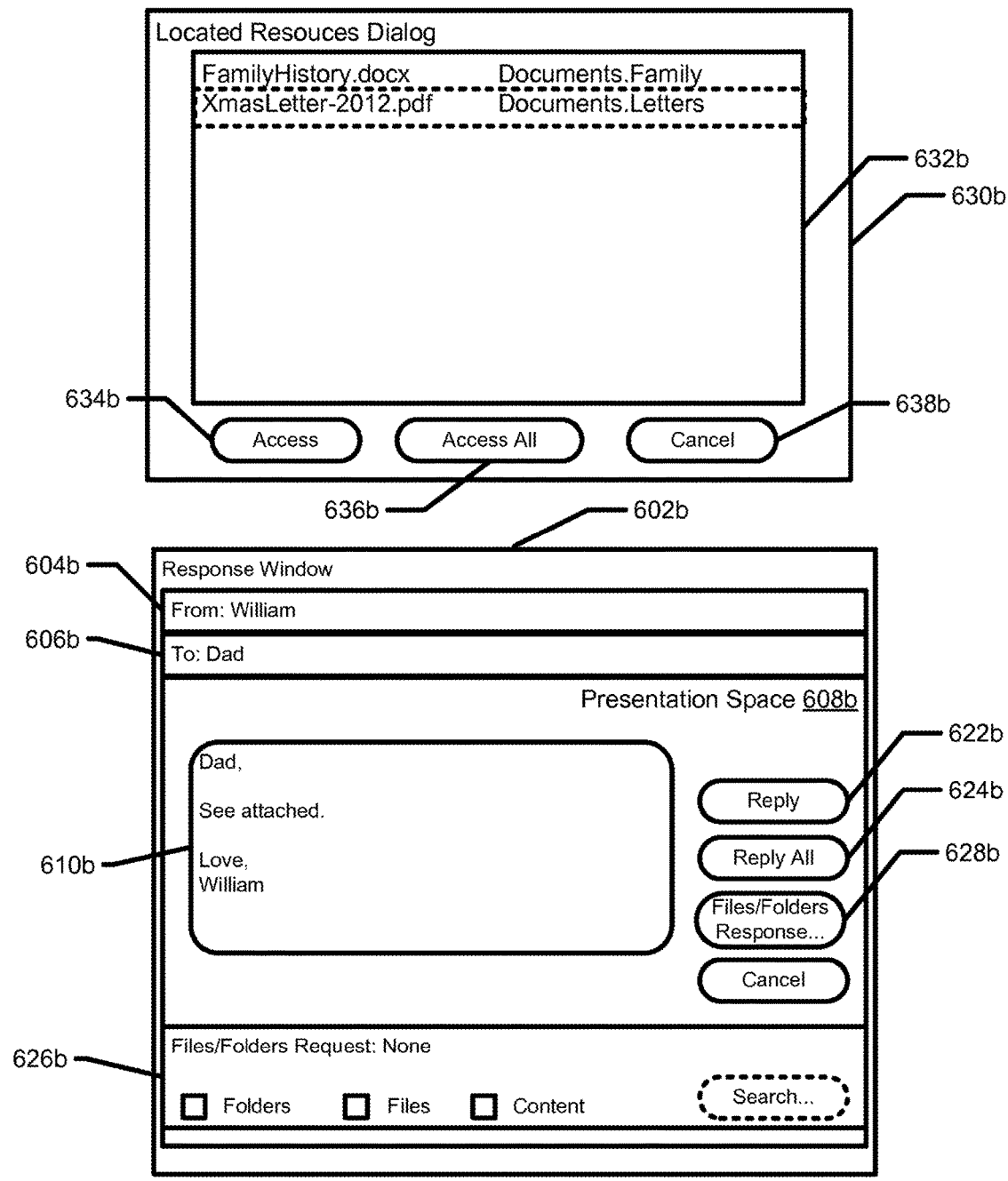
FIG. 6B is a diagram illustrating a user interface presented via a display according to another aspect of the subject matter described herein.
Figure 6C:
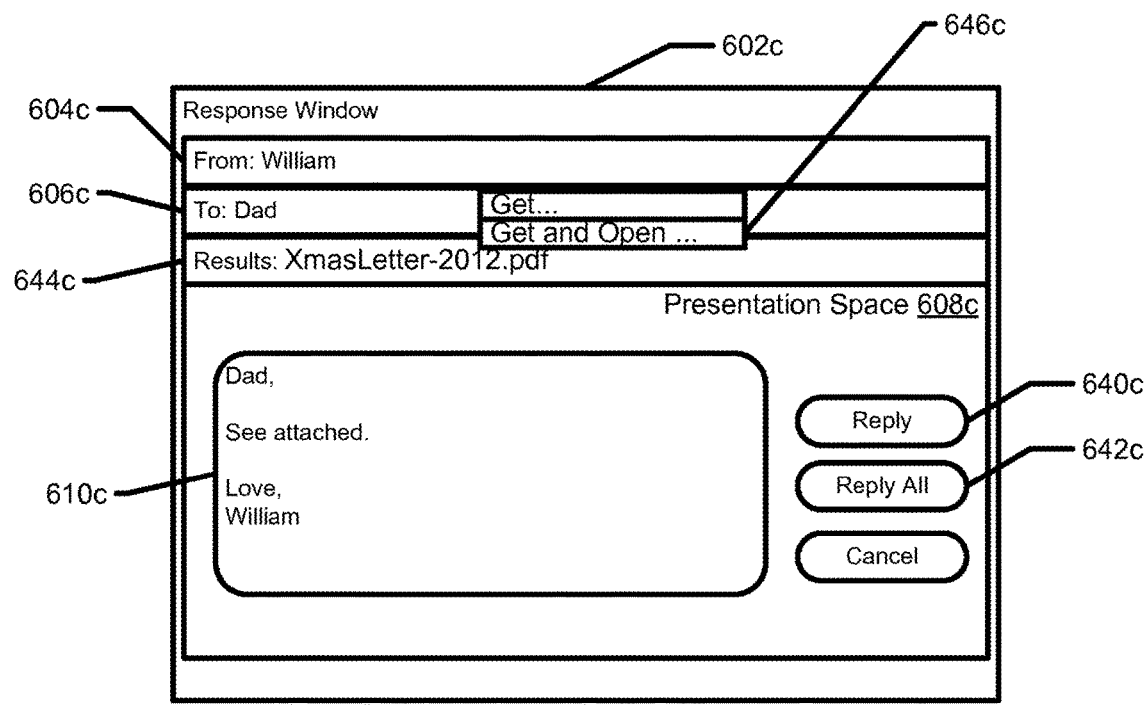
FIG. 6C is a diagram illustrating a user interface presented via a display according to another aspect of the subject matter described herein.
Figure 6D:
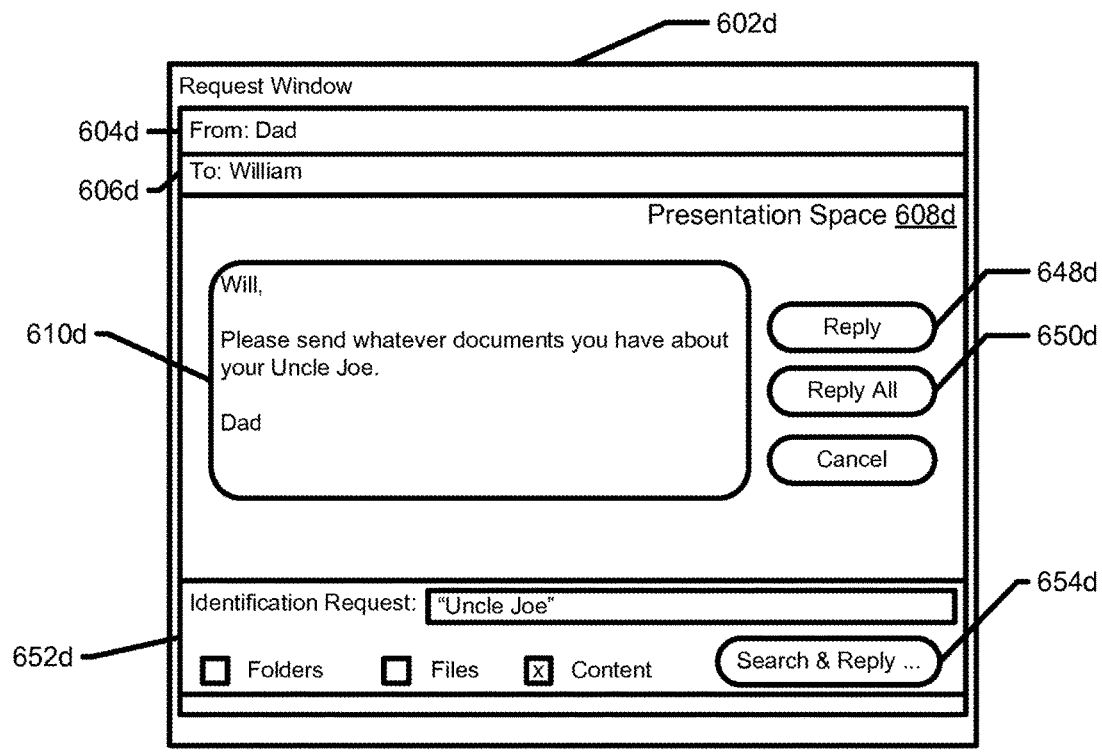
FIG. 6D is a diagram illustrating a user interface presented via a display according to another aspect of the subject matter described herein.

FIG. 6D illustrates a window, request window UI element 602d, presenting an exemplary representation of a message, such a second message 708 in FIG. 7, received from execution environment 401 of first node 502 in a communication with execution environment of second node 504. As in FIG. 6A, request window UI element 602d includes a contactor UI element 604d, a contactee UI element 606d, a presentation space 608d of the request window UI element 602d that includes a communicant message UI element 610d including a text portion of the message provided by the communicant represented by execution environment 401 of first node 502. The various UI elements may be presented by one or more UI element handler components 415 in communications agent 403 operating in execution environment 401 of second node 504. A reply UI element 648d and a reply all UI element 648d are illustrated as exemplary UI elements in presentation space 608d presented to allow a user of execution environment 401 of second node 504 to respond and/or otherwise perform an operation based on the received message. FIG. 6D illustrates a data object request UI interface element 652d where the data object request identified in the message from execution environment 401 of first node 502 is represented to the communicant represented by the execution environment 401 of second node 504. Data object request UI interface element 652d is based on the id-request XML document that constrains the request. Data object request UI interface element 652d illustrates the choices allowed by the user of the first communications agent 403 based on one or more construction constraints specified by a schema for <id-request> XML documents. Data object request UI interface element 652d illustrates that the data object request identifies, based on the construction constraint, a scope specifying at least a portion of a data store of execution environment 401 of second node 504 for locating one or more data objects that match the data object request.

In an aspect, the communicant represented by the second communications agent 403 is allowed to authorize the request by providing an input corresponding to a search and reply UI element 654d. In another aspect, the communicant may be allowed to modify the received data object request. The communications agent 403 may enforce the construction constraint. In another aspect, the communicant receiving the data object request may be allowed to break the construction constraint in modifying the data object request.

Figure 6E:
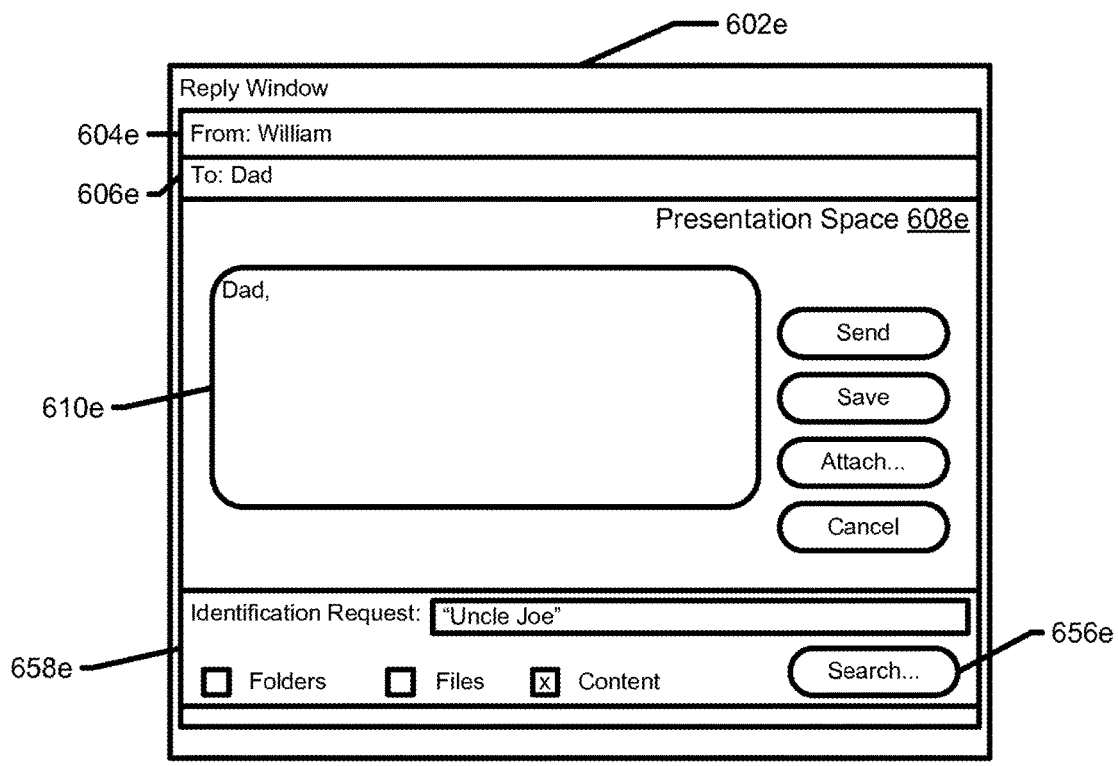
FIG. 6E is a diagram illustrating a user interface presented via a display according to another aspect of the subject matter described herein.

FIG. 6E, illustrates a reply window UI element 602e that, in an aspect, may be presented by communications agent 403 in execution environment 401 of second node 504 in response to a user input corresponding to reply UI element 648d detected by a corresponding UI element handler component 415. In an aspect, a user of communications agent 403 operating in execution environment 401 of second node 504 may provide input authorizing some or all of the processing of a data object request. Reply window UI element 602e in FIG. 6E includes a search UI element 656e to receive user input authorizing and/or otherwise instructing execution environment 403 of second node 504 to locate data objects that match the data object request, illustrated in a data object requested UI element 658e.

In another aspect, content manager component 409 may detect content type information to detect a data object request in a communication. For example, the message portion illustrated in FIG. 8A may be received in second message 708. Content manager component 409 may detect "application/id-request" MIME type identifier in content-type header 806a. The "application/id-request" MIME type identifier may be defined to identify a data object request based on one or more matching criteria to identify a requested data object. Content manager component 409 may identify data object request portion 804a as including the data object request.

In response to detecting a data object request in second message 708, content manager component 409 may provide some or all of the data object request to query handler component 408. For example, query handler component 408 may be configured to operate according to a schema defining a format and/or a vocabulary for an XML-based language for id-request XML documents. Content manager component 409 may provide id-request document 808a, as a data object request, to query handler component 408. Query handler component 408 may operate according to the id-request schema. In an aspect, a query handler component may process more than one data object request content type. Alternatively or additionally, execution environment 401 may include multiple query handler components 408 to support multiple data object request content types.

Returning to FIG. 2A, a block 210 illustrates that the method yet further includes initiating an operation to locate a data object, that meets the construction constraint, in a data store in the second execution environment based on the data object request. Accordingly, a system for constraining a data exchange requested in a communication includes means for initiating an operation to locate a data object, that meets the construction constraint, in a data store in the second execution environment based on the data object request. For example, the arrangement in FIG. 3, includes query director component 310 that is operable for initiating an operation to locate a data object, that meets the construction constraint, in a data store in the second execution environment based on the data object request. FIG. 4 illustrates query director component 410 as an adaptation and/or analog of query director component 309 in FIG. 3. One or more query director components 410 operate in an execution environment 401. The system for query director includes one or more processors and logic encoded in one or more tangible media to execute by the one or more processors that when executed is operable for initiating an operation to locate a data object, that meets the construction constraint, in a data store in the second execution environment based on the data object request. In FIG. 4, a query director component 410 is illustrated as a component of communications agent 403.

FIG. 7 further includes a locate dataflow message 712 that illustrates a locate message to search for and/or otherwise locate one or more data objects based on the data object request constrained based on the constraint notification. The data object request may include and/or otherwise identify a data object matching criterion identified by data object information identified by the communicant represented by execution environment 401 of first node 502. The data object information may be constrained based on the construction constraint and/or the constraint may be enforced later. The one or more data objects may be located and/or otherwise identified by determining a data object or data objects that match the data object matching criterion. The data object(s) may be in a data store accessible to execution environment 401 of second node 504, such as one or more files in a file system of execution environment 401 of second node 504.

Query handler component 408 may provide and/or otherwise identify search information identifying a search criterion to query director component 410 to perform, direct, and/or otherwise initiate an operate to locate one more data objects that match the search criterion. The search criterion is based on the data object request. The search criterion may be based on matching criterion when included in a data object request. Any suitable data store(s) and/or file system(s) search facility may be invoked by query director component 410. Dataflow message 712 may be internal to execution environment 401 of second node 504 and/or may be a message sent to a remote device, such as database server and/or a network attached storage device providing storage locations for some or all of a file system of execution environment 401 of second node 504.

As described above, a data object request may identify, based on a construction constraint, a scope specifying some or all of a data store of the execution environment that received the data object request. A communications agent in the execution environment may initiated an operation to locate a data object in the specified scope of the data store.

FIG. 7 illustrates a create data object response (createResp) data flow message 714 to process a result returned from locate dataflow 712. In FIG. 4, dataflow message 714 in FIG. 7 may represent data exchanged between query handler component 408 and query director component 410 to process results returned from a search operation performed based on the data object request, as illustrated by dataflow message 712. Processing the results may include creating and/or otherwise constructing a data object response to the data object request identified in second message 708. Dataflow message 714 may be internal to execution environment 401 of second node 504 and/or may include interoperation by execution environment 401 of second node 504 via a network with another execution environment and/or node.

Generating a data object response may include determining that a corresponding construction constraint is met. Generating a data object response, in response to receiving the data object request in second message 708, may include sending presentation information to present, to a user of execution environment 401 of second node 504, a plurality of data objects located in response to communications agent 403 initiating an operation to locate one or more data objects that match the data object request. A UI element handler component 415 may receive selection information, in response to a user input, identifying a data object in the presented data objects. The data object response may be generated in response to and/or otherwise based on receiving the selection information. In another aspect, a data object response may be generated automatically in response to detecting the data object request without user intervention.

Figure 6F:
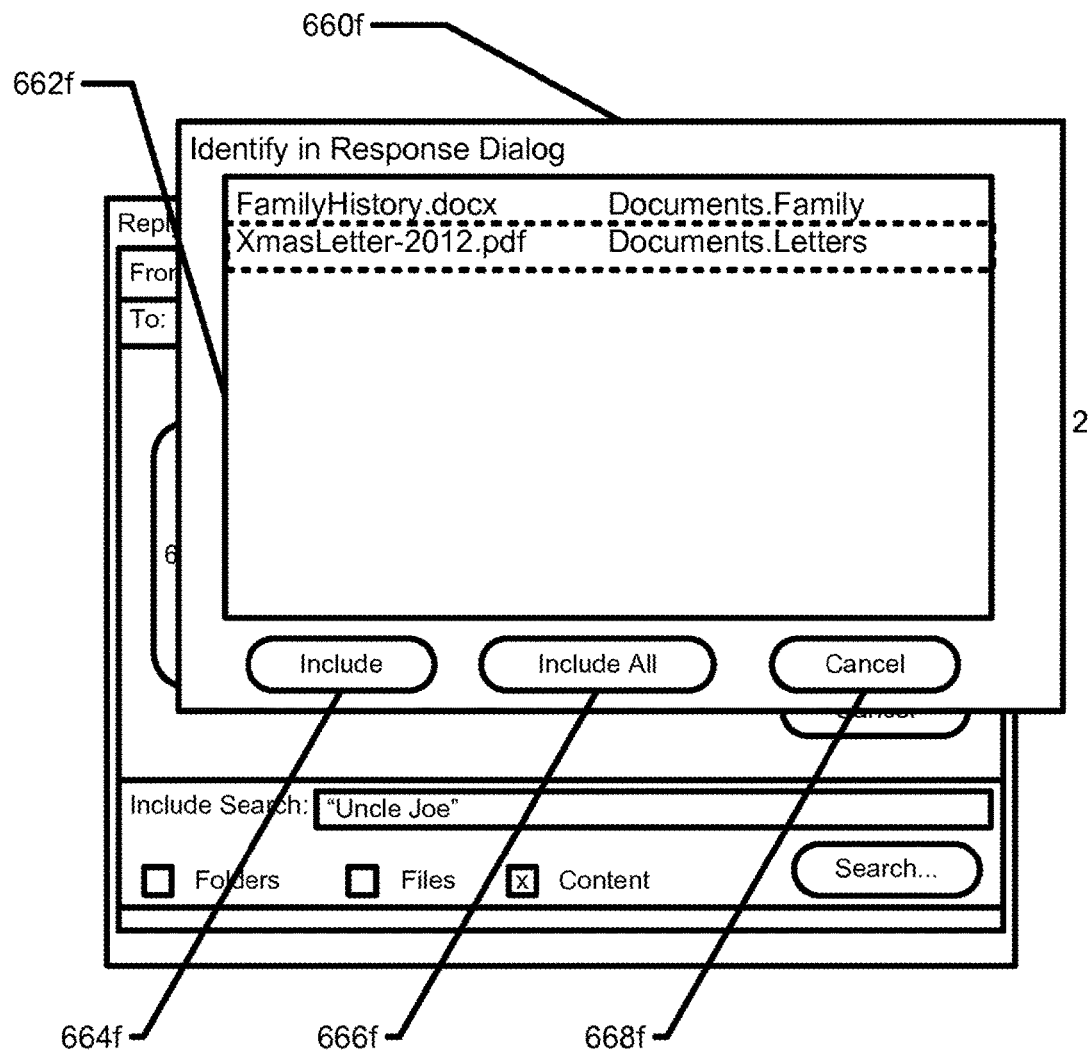
FIG. 6F is a diagram illustrating a user interface presented via a display according to another aspect of the subject matter described herein.

FIG. 6F, illustrates an identify-in-response dialog UI element 660f that, in an aspect, may be presented by communications agent 403 in execution environment 401 of second node 504 in response to processing the data object request to locate matching data objects. A user of communications agent 403 operating in execution environment 401 of second node 504 may provide input corresponding to search UI element 656e in reply window UI element 602e in FIG. 6E. A corresponding UI element handler component 415 may operate to invoke query director component 410 to perform and/or otherwise to provide for performing one or more operations to locate one or more data objects based on the data object request. Query director component 408 may interoperate with one or more UI element handlers 415, directly or indirectly via query handler component 408 to present the UI element 660f and its contents. Identify-in-response dialog UI element 660f includes results pane UI element 662f including representations of two data objects located and/or otherwise identified by query director component 410 based on the data object request. A user may select one or more data objects to identify in a data object response, constraining the response. An include UI element 664f may be presented, as illustrated, to allow a user to instruct communications agent 403 to identify one or more selected data objects in results pane UI element 662f in a data object response. An include all UI element 666f is illustrated to allow a user input to instruct communications agent 403 to identify all data objects represented in the UI element 660f in a data object response in a communication with execution environment 401 of first node 502. A cancel UI element 668f allows a user to end presentation of dialog UI element 660f. A user may opt to identify no data objects represented in the dialog UI element 660f that query director component 410 located and/or otherwise identified based on the data object request.

Data objects located and/or otherwise identified by query director component 410 may be identified to data object response builder (RB) component 427 to construct and/or otherwise create a data object response identifying the data objects. As described above, in an aspect, a user may be allowed to select which data objects, if any, are to be identified in a data object response from one or more data objects located and/or otherwise identified by query director component 410 based on a corresponding data object request. In another aspect, communications agent 403 in FIG. 4 may invoke query director component 410 automatically to locate one or more data objects based on a data object matching criterion identified in a data object request and in response to detecting the data object request in a communication. In another aspect, communications agent 403 may invoke query director component 410 automatically to locate one or more data objects based on a data object request in a communication in response to detecting an indication to present, via a output device, some or all of a communicant message received in the communication. Query director component 410 may be invoked and/or may operate based on the data object request and/or data object matching criterion identified to locate a data object prior to, during, and/or after other content received in the communication is processed.

The method illustrated in FIG. 2A may include additional aspects supported by various adaptations and/or analogs of the arrangement of components in FIG. 4. In another aspect, locating a data object may include presenting a locator UI element representing a data object request. Search UI element 656e in FIG. 6E exemplifies one type of locator UI control. Search UI element 656e may be presented by presentation controller component 417 as described above. A user input corresponding to a search UI element, such as search UI element 656e, may be detected by presentation controller component 417. Presentation controller component 417 may instruct query director component 410 to locate the data object based on a data object request represented by the data object request UI element 658e.

As described above with respect to FIG. 6D, initiating an operation to locate a data object based on a data object request may include presenting a locator user interface element based on the data object request. A user input may be detected that corresponds to the locator user interface element. The data object may be located based on the data object request in response to detection of the user input. Presenting the locator user interface element may include receiving data object request change information in response to a user input, detected via an input device. The data object may be located based on the changed data object request and the change information. A data object request UI element may be presented by a UI element handler component 415 to receive one or more additional matching criteria from a user. Based on the data object request UI element and input from the user, query director component 410 may receive one or more additional data object matching criterion information and/or may receive input to modify a data object matching criterion identified in a received data object request. Query director component 410 may locate one or more data objects in response to receiving the additional criterion. Locating the data object may be performed in response to determining that the construction constraint is met for the changed data object request As described above, FIG. 7 includes third message dataflow message 716 illustrating a third message sent via network 506 to execution environment 401 of first node 502 from execution environment 401 of second node 504. Third message 716 includes a data object response in response to the data object request from execution environment 401 of first node 502 received and/or otherwise identified in second message 708.

Response builder component 427 may provide the data object response to content manager component 409 to include in a message, illustrated by third message 716. As described above, content manager component 409 may receive and/or otherwise identify various portions of a message, including a data object response, from one or more content handler components 413. The data object response may be provided to content manager component 409. As described above, content manager component 409 in execution environment 401 of second node 504 may package and/or otherwise may prepare for packaging the one or more data representations including a representation of the data object response into the message formatted according to a suitable communications protocol. Communications protocol component 407 operating in execution environment 401 of second node 504 may send the data as a message in a communication with execution environment 401 of first node 502 according to the specification(s) of the communications protocol. Content manager component 409 may alternatively or additionally encode and/or otherwise transform one or more of the data representations to send in a data stream such as voice stream and/or a video stream to communicate in the communication to the communications agent.

FIG. 8B illustrates an exemplary data object response described above. Communicant message portion 804b illustrates a communicant message portion that may be included in third message 716. Note that a communicant message portion may be empty or absent in some aspects. Data object response portion 806b illustrates the data object response as a list of URIs identifying data objects in a file system of execution environment 401 of second node 504. Communicant message portion 804b and data object response portion 806b may be provided by respective content handler components 413 to content manager component 409. Content manager component 409 may construct the content as illustrated in FIG. 8B and/or otherwise provide to encode, translate, combine, and/or otherwise prepare the content to send in fourth message 718. Alternatively or additionally, a data object response may identify a data object by including the data object in a communication as an attachment, such as an email attachment. The data object response portion 806b in FIG. 8B is included in message portion 800b separated from the communicant message portion 804b.

With reference to FIG. 2B, a block 212 illustrates that the method includes receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network. Accordingly, a system for constraining a data exchange requested in a communication includes means for receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network. For example, the arrangement in FIG. 3B, includes content manager component 309 that is operable for receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network. FIG. 4 illustrates content manager component 409 as an adaptation and/or analog of content manager component 309 in FIG. 3B. One or more content manager components 409 operate in an execution environment 401. The system for constraining a data exchange requested in a communication includes one or more processors and logic encoded in one or more tangible media to execute by the one or more processors that when executed is operable for receiving, via a network by a first communications agent representing a first user and operating in a first execution environment, a first message including a constraint notification identifying a construction constraint from a second communications agent representing a second user and operating in a second execution environment, wherein the first message is received in a communication according to a communications protocol via a network. In FIG. 4, a content manager component 409 is illustrated as a component of communications agent 403.

As described above, FIG. 7 illustrates first message 706, including a constraint notification identifying a construction constraint, received via network 506 by execution environment 401 of first node 502 from execution environment 401 of second node 504.

As described above with respect execution environment 401 of second node 504 receiving second message 708, execution environment 401 of first node 502 may also include a content manager component 409, illustrated in FIG. 4. Content manager component 409 may operate to detect a constraint notification received and/or otherwise identified in a message and/or data unit received in a communication according to a communications protocol. Content manager component 409 operating in execution environment 401 of first node 502 may receive the message, illustrated by first message 706, in a communication with execution environment 401 of second node 504. Com-in component 411 in execution environment 401 of first node 502 may receive the message via communication protocol component 407 and network stack 405. First message 706 may be delivered to execution environment 401 of first node 502 via network 506 based on a communications address of a communicant represented by communications agent 403 in execution environment 401 of first node 502.

First message 706 in FIG. 7 may be received via network 506 by network stack 405 and communications protocol component 407 in an instance of and/or analog of execution environment 401 including and/or otherwise provided by execution environment 401 of first node 502. The data in the communication may be received by com-in component 411. Com-in component 411 may provide the data to content manager component 409. Content manager component 409 may determine one or more content types of the data. The content and/or portions of the content may be provided to one or more content type handler components 413 based on the one or more content types identified by content manager component 409.

As described above with respect to receiving a constraint notification in a message, a constraint notification included in a communicant message when sent in a message and/or data unit of a communications protocol. The constraint notification may be included as presentation data to present to at user represented by a receiving communications agent. The presentation data may be presented to receive data object information. A data object request may be based on the data object information received that corresponds to the presentation.

Returning to FIG. 2B, a block 214 illustrates that the method further includes generating, by the first communications agent and based on the construction constraint, a data object request to identify a data object in a second data store of the second execution environment. Accordingly, a system for constraining a data exchange requested in a communication includes means for generating, by the first communications agent and based on the construction constraint, a data object request to identify a data object in a second data store of the second execution environment. For example, the arrangement in FIG. 3B, includes constraint content component 314 that is operable for generating, by the first communications agent and based on the construction constraint, a data object request to identify a data object in a second data store of the second execution environment. FIG. 4 illustrates constraint content component 414 as an adaptation and/or analog of constraint content component 314 in FIG. 3B. One or more constraint content components 414 operate in an execution environment 401. The system for constraining a data exchange requested in a communication includes one or more processors and logic encoded in one or more tangible media to execute by the one or more processors that when executed is operable for generating, by the first communications agent and based on the construction constraint, a data object request to identify a data object in a second data store of the second execution environment. In FIG. 4, constraint content component 414 is illustrated as a component of communications agent 403.

FIG. 7 includes dataflow message 718 that illustrates a data flow internal to execution environment 401 of first node 502 and/or a message received via network 506 by execution environment 401 of first node 502. Dataflow message 718 illustrates a data object information dataflow to constraint content component 414 operating in execution environment 401 of first node 502. Data object information is identified to and/or otherwise received by constraint content component 414, based on the construction constraint.

In various aspects, a constraint content component 414 may receive data object information from a user via one or more UI element handler components 415. The data object information may be received, in response to a user input detected by an input device of an execution environment 401 that includes the constraint content component 414. Alternatively or additionally, data object information may be received by a constraint content component in a message received via a network. For example, a user may identify data object information to a browser operating in a client node. The browser may send the data object information via a network communicatively coupling the client node to a web service provider node. The web service provider node may include a constraint content component that may operate to receive the data object information identified in the message from the browser.

As described above, FIG. 6A illustrates an exemplary user interface that may be presented by communications agent 403 operating in execution environment 401 of first node 502 to receive data object information for a data object request.

A construction constraint may be specified to constrain and/or prevent a data object request from identifying a data object in a data store of an execution environment based on at least one of a location of the data object in the data store, at least a portion of a file name of the data object, a file type of the data object, a content type of data included in the data object, at least a portion of the content of the data object, an attribute of the data object that is represented in the execution environment, an attribute of the data object that is not represented in the execution environment, a relationship between the data object and at least one of communicant, a communications protocol for exchanging data in a communication, and/or an attribute of a communicant message exchanged between communications agents.

Returning to FIG. 2B, a block 216 illustrates that the method yet further includes sending, via the network to the second communications agent, a second message including the data object request. Accordingly, a system for constraining a data exchange requested in a communication includes means for sending, via the network to the second communications agent, a second message including the data object request. For example, the arrangement in FIG. 3B, includes request constructor component 316 that is operable for sending, via the network to the second communications agent, a second message including the data object request. FIG. 4 illustrates request constructor component 416 as an adaptation and/or analog of request constructor component 316 in FIG. 3B. One or more request constructor components 416 operate in an execution environment 401. The system for request constructor includes one or more processors and logic encoded in one or more tangible media to execute by the one or more processors that when executed is operable for sending, via the network to the second communications agent, a second message including the data object request. In FIG. 4, an request constructor component 416 is illustrated as a component of application 403.

FIG. 7 includes dataflow message 720 that illustrates a data flow internal to execution environment 401 of first node 502 and/or message received via network 506 by execution environment 401 of first node 502. Dataflow message 720 illustrates a create data object request (DOReg) dataflow to a request constructor component 416 operating in execution environment 401 of first node 502. Data object information may be identified to and/or otherwise provided to request constructor component 416. A query handler component 408 may identify and/or otherwise provide data object information to a request constructor component 416.

A request constructor component may be a type of content handler component that operates to process data object information to create a data object request that conforms to a schema to create and/or otherwise construct a valid data object request. The request constructor component 416 may construct and/or otherwise create a data object request based on a schema that defines and/or otherwise identifies a valid data object request and/or a valid data object response for a particular type of communication supported by a communications agent. The data object request is constructed and/or otherwise created, based on the data object information, by the request constructor component 416. Request constructor component 416 in execution environment 401 of first node 502 may provide the data object request to content manager component 409 to include and/or otherwise identify the data object request in a communication with execution environment 401 of second node 504, such as email and/or instant message. Content manager component 409 may interoperate with other types of content handler components 413 to create and/or otherwise construct a message that includes the valid data object request.

In an aspect, request constructor component 416 may interoperate with content manager component 409 to create a valid data object request according to a specified schema for the message, so that the message is valid according to a communications protocol supported by a communications protocol component 407 that operates to send the message. As described above, the content manager component 409 may operate in execution environment 401 of first node 502 along with a request constructor component 416 to transform data object information into a data object request to include along with data for other parts of a communication into one or more representations suitable to transmit in a communication to another node, such as execution environment 401 of second node 504. Some or all of the representations transmitted are suitable to process by the communications agent in execution environment 401 of second node 504. The content manager component 409 in the execution environment 401 of first node 502 may package the one or more data representations including a representation of the data object request into a message and/or data unit formatted according to the communications protocol.

In FIG. 8A, a portion of an email communication 800a is illustrated formatted as a multipart/mixed content type including data object request portion 804a. A data object request portion of a communication may be identified as and/or as including a data object request by its location in the communication, by an identifier or markup element, such as a MIME type identifier, and/or by a file type extension. A data object request may be detected based on content included in the message and/or based on metadata such as content-type header 806a identifying a MIME type identifier, such as "application/id-request", which may be defined to represent one or more matching criteria in a data object request. The "application/id-request" MIME type identifier is exemplary. Other MIME type identifiers exist and/or may be defined to identify a data object request in a communication.

A request constructor component 416 and/or a content manager component 409 may operate to construct a data object request in a communication based on XQuery, regular expression, and/or SQL content—to name a few examples. A content type identifier may be included in a position and/or location that identifies a data object request in a communication. The position or location may be absolute or relative. For example, a schema for a communication may define that a data object request in a communication is included in the communication at the end of the communication. There may be one or more data object requests at the end. In another aspect, a schema for a communication may specify that a portion of a communication following a particular type of message portion is a data object request. Other data object requests may follow. If no data object request is included, the data object request portion may include no content or may include an indicator that no data object request is included.

FIG. 8A illustrates an "application/id-request" MIME type identifier that may be defined to identify a schema for an XML-based language to specify and constrain id-request XML documents. FIG. 8A illustrates id-request document 808a. Id-request document 808a, as illustrated, includes criterion tag elements 810a corresponding to the form elements in the user interface illustrated in FIG. 6A. A criterion tag element 810a identifies a data object matching criterion name, such as "query" indicating that the criterion is a query expression or a portion thereof. A "type" attribute identifies a schema with the identifier "keyword" for the expression. The criterion tag element 810a identifies a value for a query "Uncle Joe" in a match-expression attribute. Another criterion tag element 810a specifies a scope query specified in the first criterion tag element. FIG. 8A illustrates an "and" tag 812a indicating that all the matching criteria must be met in identifying a data object. An "or" tag (not shown) may be defined by a schema for id-request documents. Other operator elements and operator precedence may be defined by the schema. Grouping elements to manage operator precedence, such as a parenthesis element, may be defined by the schema.

As described above, FIG. 7 includes dataflow message 708 that illustrates second message, including a data object request, sent via network 506 by execution environment 401 of first node 502 to execution environment 401 of second node 504.

A data object request generated by a request constructor component 416, along with a communicant message and any other data to include in a communication, may be provided and/or otherwise identified to content manager component 409 to send in the communication. The content manager component 409 in execution environment 401 of first node 502 may package the data including a representation of the data object request into the message formatted according to the communications protocol. Com-out component 419 may provide the data object request, the communicant message, and any other data to send in the communication in representations suitable to send by communications protocol component 407 to the communications agent in execution environment 401 of second node 504. Communications protocol component 407 operating in execution environment 401 of first node 502 may send the data as and/or in a communication, such as an email message, according to the specification(s) of the communications protocol. Communications protocol component 407 may further package and/or otherwise transform the data to send via network stack 405 to deliver via network 506 to execution environment 401 of second node 504.

Content manager component 409 may alternatively or additionally encode and/or otherwise transform one or more of the data representations to send in a data stream such as voice stream and/or a video stream to communicate in a communication with the communications agent in execution environment 401 of second node 504.

Returning to FIG. 2B, a block 218 illustrates that the method yet further includes receiving, by the first communications agent in response to sending the data object request, a third message that includes a data object response, constrained based on the construction constraint, that identifies the data object. Accordingly, a system for constraining a data exchange requested in a communication includes means for receiving, by the first communications agent in response to sending the data object request, a third message that includes a data object response, constrained based on the construction constraint, that identifies the data object. For example, the arrangement in FIG. 3B, includes result handler component 318 that is operable for receiving, by the first communications agent in response to sending the data object request, a third message that includes a data object response, constrained based on the construction constraint, that identifies the data object. FIG. 4 illustrates result handler component 418 as an adaptation and/or analog of result handler component 318 in FIG. 3B. One or more result handler components 418 operate in an execution environment 401. The system for constraining a data exchange requested in a communication includes one or more processors and logic encoded in one or more tangible media to execute by the one or more processors that when executed is operable for receiving, by the first communications agent in response to sending the data object request, a third message that includes a data object response, constrained based on the construction constraint, that identifies the data object. In FIG. 4, a result handler component 418 is illustrated as a component of application 403.

As described above, FIG. 7 includes dataflow message 716 that illustrates third message, including a data object response, received via network 506 by execution environment 401 of first node 502 from execution environment 401 of second node 504.

In addition to packaging communication information including a data object request into a valid communication, content manager component 409 operating in execution environment 401 of first node 502 may interoperate with communications protocol layer component 407 and/or network stack 405 to receive data in one or more communications via network 506 with another communications agent in another execution environment and/or node. A result handler component 418 may receive some or all of the communication in receiving and/or otherwise identifying a data object response in the communication. Content manager component 409 in FIG. 4 operatively couples result handler component 418 with network 506, via com-in component 411, communications protocol component 407 and/or network stack 405 to receive the data from the other node. Thus, execution environment 401 of first node 502 may receive a communication, via content manager component 409 and result handler component 418, that includes a data object response that is a response to a data object request detected by execution environment 401 of second node 504 in a message received previously from the execution environment 401 of first node 502.

Com-in component 411 may provide data received in the communication to content manager component 409. Content handler component 409 may identify a data object response in the communication sent from the execution environment 401 of second node 504. Content manager component 409 may interoperate with result handler component 418 in identifying the data object response. The data object response may be identified by content manager component 409 according to a schema for the communication. For example, a portion of an email message may include a MIME-type identifier that identifies a corresponding part of the email as a data object response and/or otherwise identifies data to route to a result handler component 418 in communications agent 403 in execution environment 401 of first node 502 to detect the data object response.

Data sent in third message 716, by execution environment 401 of second node 504, may be received by com-in component 411 operating in an instance, adaptation, and/or analog of execution environment 401 including and/or provided by first node 502. The received communication includes a message addressed to the a communicant represented by communications agent 403 in execution environment 401 of first node 502 and a data object response identifying a data object located and/or otherwise identified based on the data object request in second message 708. Content manager component 409 may detect the communicant message, such as message portion 804b in third message 716. Content manager component 409 may detect a data object response, such as data object response portion 806b in third message 716. In an aspect, a data object response may be processed as an attachment. Alternatively or additionally, a data object response may be distinguished, by for example a content manager component 409 as a type of attachment or as a part of a communication that is different than an attachment and processed accordingly. Message portion 804b and data object response portion 806b may be provided to suitable content handler components 413 based on the content types of the message portion and the data object response portion detected by content manager component 409. In FIG. 4, data object response portion 806b may be provided to result handler component 418 as a content handler that matches the MIME type field 808b illustrated in FIG. 8A.

In an aspect, a data object response that is a response to a data object request sent in a previous message may include information identifying and/or may include one or more data objects located and/or otherwise identified by execution environment 401 of second node 504 that processed the data object request. For example, a data object response may be sent that identifies a URI for each data object located and/or otherwise identified by execution environment 401 of first node 502 in response to processing a corresponding data object request.

Returning to FIG. 2B, the method may further include sending, based on the data object response, a fourth message, via the network by the first execution environment, to access the data object. Accordingly, a system to process a data object request in a communication includes means to send, based on the data object response, a fourth message, via the network by the first execution environment, to access the data object. For example, the arrangement in FIG. 4, includes access request constructor component 429 that is operable to send, based on the data object response, a fourth message, via the network by the first execution environment, to access the data object. One or more access request constructor components 429 operate in an execution environment 401. The system to process a data object request in a communication includes one or more processors and logic encoded in one or more tangible media to execute by the one or more processors that when executed is operable to send, based on the data object response, a fourth message, via the network by the first execution environment, to access the data object. In FIG. 4, a access request constructor component 429 is illustrated as a component of result handler component 418.

FIG. 7 includes dataflow message 722 that illustrates a present message that may be internal to execution environment 401 of first node 502 and/or may be a message sent to a remote device, such as a node including a browser, to send presentation information to present, via an output device, a representation of the data object response received in third message 716. FIG. 7 also includes dataflow message 724 that illustrates a create access request message that may be a data flow internal to execution environment 401 of first node 502 and/or a message received via network 506 by execution environment 401 of first node 502. In the dataflow message 724 an ARC component 429 operating in execution environment 401 of first node 502 may be invoked to operate based on result information. Result information may be identified to and/or otherwise by ARC component 429 as part of and/or in response to being invoked.

Result handler component 418 may be a type of content handler component 413 that operates to process data representations and may provide transformed data from the representations to one or more user interface element handler components 415. Result content handler component 418 may operate to process data object responses according to a schema defining valid data object responses. Content manager component 409 may provide and/or otherwise identify various portions of a communication, such as a data object response, to one or more content handler components 413. The data object response may be provided to result handler component 418. In an aspect, result handler component may interoperate with the presentation controller component 417 in the execution environment 401 of first node 502 to present the data received in the data object response and/or other data received in the communication.

FIG. 6B illustrates a response window UI element 602b as an exemplary user interface that may be presented by communications agent 403 operating in execution environment 401 of first node 502 to present data received in a communication from execution environment 401 of second node 504. FIG. 6B illustrates a contactor UI element 604b, a contactee UI element 606b, a presentation space 608b of the response window UI element 602b. Presentation space 608 includes a communicant message UI element 610b, analogous to similar UI elements described with respect to FIG. 6A. The various UI elements may be presented by one or more UI element handler components 415 in the communications agent 402 in execution environment 401 of first node 502. A reply UI element 622b and a reply all UI element 624b illustrate UI elements in presentation space 608b presented to allow a user of the execution environment 401 of first node 502 to respond and/or otherwise instruct execution environment 401 of first node 502 to perform an operation based on the message received in the communication. FIG. 6B illustrates a files/folders request UI interface element 626b where the presented term "None" may be defined to indicate no data object request was detected by the content manager component 409 in execution environment 401 of first node 502 in the communication received from execution environment 401 of second node 504 via network 506.

Response window UI element 602b in FIG. 6B includes a files/folders response UI element 628b to receive user input to display a representation of one or more data objects located and/or otherwise identified by the execution environment 401 of second node 504 and identified in the data object response. In an aspect, a data object may be identified but not included in the message received in the communication. In response to an input directed to data object response UI element 628b, a corresponding UI element handler 415 may interoperate with result handler component 418 to present a located data resources dialog UI element 630b that includes a presentation space 632b to present a user detectable representation of some or all of the data objects identified in the received data object response from the execution environment 401 of second node 504. In an aspect, one or more data objects located and/or otherwise identified by execution environment 401 of second node 504 may be included in a communication as attachments. In a further aspect, located and/or otherwise identified data objects not included in the message may be identified as described with respect to located and/or otherwise identified data objects dialog UI element 630b and/or in any other suitable manner. In yet another aspect, files and/or other data entities identified in the data object response may be illustrated in a manner similar to attachments rather than in a separate UI element as in FIG. 6B, and accessed from execution environment 401 of second node 504 via network 506 as described below.

FIG. 6B illustrates an access UI element 634b and an access all UI element 636b allowing a user to provide user input(s) to instruct communications agent 403 in execution environment 401 of first node 502 to request one or more data objects identified in the data object response.

FIG. 7 includes a dataflow message 726 that illustrates a fourth message that includes an access request to access a data object identified in the data object response received in third message 716. FIG. 7 illustrates the access request is sent via network 506 by execution environment 401 of first node 502 to execution environment 401 of second node 504.

Figure 6G:
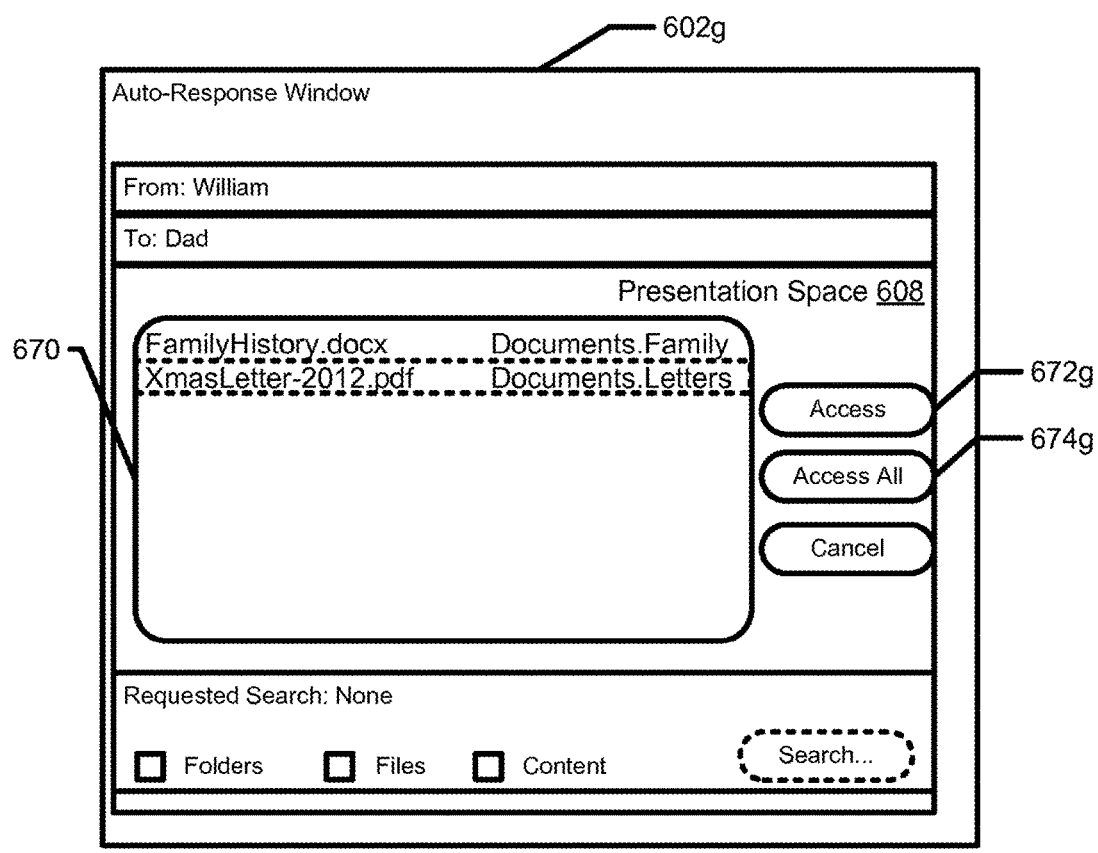
FIG. 6G is a diagram illustrating a user interface presented via a display according to another aspect of the subject matter described herein.

In response to receiving third message 716, execution environment 401 of first node 502 may present, in a manner described above, data received in the message to a user of execution environment 401 of first node 502 as described with respect to FIG. 6C. Context menu 646c provides UI elements to allow the user to instruct execution environment 401 of first node 502 to retrieve a data object identified in a data object response received from execution environment 401 of second node 504. In response to a user input corresponding to a context menu item included in context menu 646c a corresponding UI element handler component 415 may invoke ARC component 429 to construct an access request to retrieve one or more data objects identified in the data object response. FIG. 6G illustrates another exemplary user interface that execution environment 401 of first node 502 may present to the user to allow the user to instruct execution environment 401 of first node 502 to construct and send an access request. Auto-response window 602g may be presented in response to a data object response received in a communication without a communicant message. Rather than a UI element to display a communicant message, a results pane UI element 670g may be presented that identifies data objects located and/or otherwise identified by execution environment 401 of second node 504 that may be retrieved by execution environment 401 of first node 502. In an aspect, execution environment 401 of second node 504 may process a data object request and automatically send a data object response without involving the user of execution environment 401 of second node 504. The data object response may be received without a communicant message as FIG. 6G illustrates or may be received with a pre-written and/or automatically generated message. UI elements 672g-674g may be presented by execution environment 401 of first node 502 to allow the user of execution environment 401 of first node 502 to request the retrieval of one or more data objects identified in the data object response.

ARC component 429 may be invoked to construct an access request to retrieve one or more data objects identified in the data object response. An access request may be based on a URL, such as an HTTP and/or FTP URL that identifies and locates a data object. Alternatively or additionally, an access request may be sent in a communication supported by a communications agent 403, in a manner analogous to that illustrated with respect to FIG. 8A. As described above, content manager component 409 in execution environment 401 of first node 502 may package the one or more data representations including a representation of an access request into a message in a communication. The message is formatted according to a communications protocol supported by communications agent 403 in execution environment 401 of first node 502. Communications protocol component 407 operating in execution environment 401 of first node 502 may send the message according to the specification(s) of the communications protocol. Content manager component 409 may alternatively or additionally encode and/or otherwise transform one or more of the data representations to send in a data stream such as voice stream and/or a video stream to communicate in a communication.

Content manager component 409 operating in execution environment 401 included in and/or otherwise provided by execution environment 401 of first node 502 may provide the packaged, encoded, and/or transformed data to communications protocol component 407 via a com-out component 419. Com-out component 419, as described above, operatively couples communications agent 409 to communications protocol component 407 according to an interface provided by communications protocol component 407 to send data in a communication according to a communications protocol. Communications protocol component 407 may further package and/or otherwise transform the data to send via network stack 405 to deliver via network 506 to execution environment 401 of second node 504.

Returning to FIG. 2B, the method may further include receiving, via the network by the first execution environment and in response to sending the fourth message, at least a portion of the data object. Accordingly, a system to process a data object request in a communication includes means to receive, via the network by the first execution environment and in response to sending the fourth message, at least a portion of the data object. For example, the arrangement in FIG. 4, includes content director component 431 that is operable to receive, via the network by the first execution environment and in response to sending the fourth message, at least a portion of the data object. One or more content director components 431 operate in an execution environment 401. The system to process a data object request in a communication includes one or more processors and logic encoded in one or more tangible media to execute by the one or more processors that when executed is operable to receive, via the network by the first execution environment and in response to sending the fourth message, at least a portion of the data object. In FIG. 4, a content director component 431 is illustrated as a component of communications agent 403.

FIG. 7 includes dataflow message 728 that illustrates a fifth message that includes an access response received via network 506 by execution environment 401 of first node 502 from execution environment 401 of second node 504. As described above, content manager component 409 operating in execution environment 401 of first node 502 may interoperate with communications protocol layer component 407 and/or network stack 405 to receive data in a communication, via network 506, with another communications agent in another execution environment and/or node. Content manager component 409 is operatively coupled, via com-in component 411, to communications protocol component 407 to receive the data from the other node. Thus, execution environment 401 of first node 502 may receive a message in a communication with execution environment 401 of second node 504 via a com-in component 411. The message may include an access response, in response to an access request. Content director component 410 may be included in content manager component 409 to detect one or more portions of a received message, such as a portion that is a response to an access request. Content director component 421 may invoke one or more content handler components 413 to process one or more data objects provided in the message according to their type. In one aspect, a data object returned in a message, in response to an access request, may be processed as an attachment and/or in a manner analogous to processing of an attachment for a particular communications type.

The methods illustrated in FIG. 2A-B may include additional aspects supported by various adaptations and/or analogs of the arrangement of components in FIG. 3A-B. In various aspects, a construction constraint may constrain a data object request and/or a data object response based on a date, a time, a length of time, a file type, a database record key, content of the data object, a content type identifier, a format rule, a vocabulary, a role of a user, a security attribute, a location in a data store such as a file system, an attribute of an identified data object, a size, a task, a transaction, a state, a user, a group, a requester, a relationship including a requesting user and a responding user, a keyword, a tag, a folder, and/or a path portion of a data object identifier—to name a few examples.

In another aspect, a data object located and/or otherwise identified in response to receiving a data object request must meet match a query identified by the data object request constrained by a construction constraint. Alternatively or additionally, a data object request may include an instruction and/or input to generate a data object, and locating the data object may include generating the data object. One or both of the generating process and the locating process may be performed to meet the construction constraint. Generating a data object may include creating the data object and/or may include modifying and/or otherwise transforming an existing data object. For example, execution environment 401 of second node 504 may include a template stored in a file system. A data object request may identify the template. A query handler component 408 may operate to identify a document or other data object that may be created, is being created, and/or has been created based on the template. In response to an access request, execution environment 401 of second node 504 may return the document.

As described above, in various aspects, a data object request may be detected and/or represented based on various syntaxes, grammars, vocabularies, and/or languages, which may be identified in whole or in part by a construction constraint. For example, a data object request may be identified and/or represented according to a file system search syntax, a regular expression language, a structured query language (SQL) query, a universal data object identifier schema, an XPATH based language, an XQuery based language, an XML based language, an HTML based language (form-based), and/or a keyword-value pair based language.

A data object request in a communication may be communicated via a network according to a first communications protocol. A communicant message may be exchanged between communicants in the communication via a second communications protocol. For example, a data object request may be sent on behalf of a first communicant by execution environment 401 of first node 502 including a communications agent 403 representing the first communicant. The data object request may be included in a communication along with a communicant message sent to the execution environment 401 of second node 504. The communicants represented by the execution environment 401 of first node 502 and the execution environment 401 of second node 504 may communicate via one or more exchanges of audio exchanged via a voice over IP (VoIP) communications protocol.

Exemplary data objects that may be requested via a data object request include a file, a program component, a data base record, video data, audio data, markup language, binary data, text data, an output of a service. Requested data objects may be pre-existing, volatile, and/or generated in response to the request.

As described above, receiving data object information may include receiving a message, identifying the data object information, via a network from a node that received the data object information from the user. For example, data object information may be received from a browser by a web server. The web browser may present a user interface to constrain user input in order to enforce a constraint on a resulting data object request.

Data object information and/or a data object request may be generated, detected, and/or otherwise processed according to a schema that identifies at least one of a rule and a vocabulary that defines a valid data object request. Similarly, a data object response, an access request, and a response to an access request may be generated, detected, and/or otherwise processed according to a schema. One or more schemas may alone or together define one or more of valid data object information, a data object request, data object response, an access request, and/or an access response. A schema, as just describe, may be identified based on a data received and/or otherwise identified by a node hosting a communications agent via the network from another node hosting communications agent and/or from a path node included in a network path in the network communicatively coupling the node to one or more nodes that respectively host a communications agent. A construction constraint may be identified in a schema for a data object request, for data object information, for a data object response, and/or for any data entity included in generating a data object request and/or a data object response.

In a further aspect, multiple alternative schemas may be defined for each of data object information, data object requests, data object responses, access requests, an/or access responses processing data object requests. A schema may be selected and/or otherwise identified from the multiple schemas based by execution environment 401 of first node 502 and the execution environment 401 of second node 504 and/or based on information exchanged by the two nodes. For example, a schema may be selected by the first communicant and/or the second communicant. One may inform the other, via a communications protocol and/or via any other suitable means. The communicants may negotiate which schema to use via any suitable means. A schema may be selected and/or otherwise identified based on a construction constraint to be enforced. For example, a construction constraint may constrain a data object request to identify documents related to a topic identified in a communicant message exchanged in a communication. A query handler component may interoperate with a UI element handler that corresponds to a UI element for receiving some or all of a communicant message for a user to detect a topic. A topic may be detected in a subject line and/or based on a count of a specific word or phrase, for example.

The communications agents in execution environment 401 of second node 504 and execution environment 401 of first node 502 may select a schema For example, a schema may be identified and/or otherwise selected based on a communications protocol supported and/or a communications protocol not supported by one or both nodes. That is in negotiated which communication protocol to use allowing communicants to exchange information, a schema may be identified. A schema may be identified and/or otherwise selected based on an attribute of the data object. A schema to identify image data may be different than a schema for editable documents. A schema to identify a data object in a first file system may be different than a schema to identify a data object in a different file system. A construction constraint may constrain a data object request to a request for one or more digital photographs, for example. A construction constraint may constrain a data object response to identify or include one or more documents from a particular folder associated with a requesting communicant and/or based on relationship between a requesting communicant and a responding communicant.

As described above. In an aspect data object information and/or a data object request may, based on a construction constraint, identify a scope that specifies all or some portion of one or more data stores to locate a data object. For example, A communications agent 403 in execution environment 401 of first node 502 may receive user input that identifies a folder in a file system of the execution environment 401 of second node 504 that defines a scope to locate a data object.

Data object information and/or a data object request be represented in a representation that includes a complete or a portion of at least one of a keyword expression, a regular expression, an XQuery expression, an XPath expression, a file system path expression, and a structured query language statement.

Further as also described above, a data object request, a data object response, an access request, an/or an access response may be included in a message according to a schema that identifies the message as valid for a specified communications protocol. Those skilled in the art are aware that schemas for email differ from schemas for instant messages and from streamed audio, for example.

A data object request, a data object response, an access request, and/or an access response may be exchanged in a communication in which audio data and/or image data is also exchanged. Multimedia may be a packaged to include one or more data streams which may include text based data streams.

A data object request, a data object response, an access request, and/or an access response may be included in an email, an instant message, a multi-media message, a short-message service message, and/or a data stream. The data stream may include audio data, image data, and/or text data.

A data object request, a data object response, an access request, an/or an access response may be included in and/or detected in a communication message based on a location in the communication and/or based on a marker, such as an identifier in the communication that identifies a location for the data object request, the data object response, the access request, and/or the access response. The location may be absolute, such as fixed number of bytes or fields from the start or end of a message. Alternatively or additionally, the location may be identified by a location relative to another detectable portion of the communication. FIGS. 8A-B illustrate the user of MIME type identifiers as markers that identify locations for one or more of a data object request, a data object response, an access request, an/or an access response in a communication.

A data object request, a data object response, an access request, an/or an access response or respective portions thereof may include at least a portion of a keyword expression, a regular expression, expression including a Boolean operator, an expression including a precedence information, and a structured query language statement.

With respect to the method illustrated in FIG. 2A, the method as described above may include locating and/or otherwise identifying a data object automatically in response to receiving an access request that matches and/or otherwise identifies the data object. Further, a data object response may be created and/or otherwise generated automatically, in response to locating and/or otherwise identifying the data object.

In an aspect, in response to receiving and/or otherwise detecting a data object request, a user interface may be presented based on the data object request constrained by a construction constraint to prompt a user to process the data object request in some manner, such as authorizing the request and/or modify the request by restricting its scope. In response to detecting user input targeting and/or otherwise corresponding to the presented user interface, one or more data object may be located and/or otherwise identified based on the data object request as constrained by the construction constraint.

A user may change a received data object request. One or more data object may be located and/or otherwise identified based on the changed data object request. The user may further constrain and/or may override a constraint identified by a construction constraint.

In a further aspect, once one or more data objects a located and/or otherwise identified based on a data object request, a user interface may be presented to allow a user to identify the one or more data objects. User information may be received that selects one or more data objects to identify in a data object response and/or to not identify in the data object response. A user, in an aspect, may be allowed to identify a data object not located and/or otherwise identified by the user's node, which may further constrain and/or at least partially override a construction constraint. The data object, based on the user input, is identified in the data object response.

In light of the description provided above, a data object response may be generated automatically in response to detecting a corresponding data object request by an execution environment 401 of first node 502. Further, the automatically generated data object response, may be sent to the node that sent the corresponding data object request, automatically in response to the generating of the data object response.

With respect to the method illustrated in FIG. 2B, the fourth message 726, in FIG. 7, may be sent automatically in response to detecting the data object response. In another aspect, a representation of a received data object response may be presented, via an output device, to a user. The representation may identify one or more data objects located and/or otherwise identified based on the data object request. The representation may be presented automatically, in response to detecting the data object response. Further, a user input may be detected that corresponds to and/or otherwise targets the representation. The user input may be processed as an indication to retrieve the data object. As a result an access request may be created or otherwise generated that identifies the data object. The access request may be sent in a message via the network to retrieve the data object. The message may be sent to node that sent the data object response and/or to another execution environment and/or node. The fourth message 716 may be sent by the communications agent in the execution environment 401 of first node 502 to the communications agent in the execution environment 401 of second node 504 via a communications protocol. The fourth message 716, sent via the communication protocol, may include a communications address, in an address space of the communications protocol, that identifies a user represented by the communications agent in the execution environment 401 of second node 504. The fourth message 716 may include a data object request, a data object response, and/or a data object sent in response to previously receiving an access response by the execution environment 401 of first node 502. The fourth message 716 may include an access request that identifies the data object. The access request may include a universal data object identifier (URI) that identifies the data object. In an access, a data object may be identified in a data object response. Based a construction constraint, the user may not be allowed to view or otherwise access the data object from the execution environment that sent the data object response.

With respect to the method illustrated in FIG. 2A, in response to receiving an access request, a data object identified in the request may be sent. The data object may be sent automatically, in response to receiving the access request. The data object may be sent as attachment in a communication. The data object may be sent by a communications agent in the execution environment 401 of second node 504 to a communications agent in the execution environment 401 of first node 502 via a communications protocol. The data object may be sent via a communication that includes a communications address, in an address space of the communications protocol, that identifies the first communicant represented by the execution environment 401 of first node 502. The communication that includes the data object may include a data object request, a data object response, and/or an access request sent in response to a data object response sent previously by the execution environment 401 of first node.

The methods illustrated in FIG. 2A-B may yet further include additional aspects supported by various adaptations and/or analogs of the arrangement of components in FIG. 3A-B. Performing the method illustrated in FIG. 2A and/or the method illustrated in FIG. 2B and/or any of its extension and/or in any of its aspects may include one or more of calling a function or method of an object, sending a message via a network; sending a message via an inter-process communication mechanism such as a pipe, a semaphore, a shared data area, and/or a queue; and/or receiving a request such as poll and responding to invoke, and sending an asynchronous message.

Output devices suitable to present a representation of a data object and/or a tag include a visual output device, an audio output device, and a tactile output device. One output device may present a data object and another output device may present a tag with which the data object is tagged.

Any action included in performing the method illustrated in FIG. 2A as well as any action included in in performing the method illustrated in FIG. 2B may include sending and/or receiving a message via a network. Further, a message, included in performing any of the subject matter described herein and/or any of its extensions in any of its aspects, may an asynchronous message without a corresponding request.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described to perform that sequence must be followed.

Moreover, the methods described herein may be embodied in executable instructions stored in a non-transitory computer readable storage medium for use by or in connection with an instruction execution machine, system, apparatus, or device, such as a computer-based or processor-containing machine, system, apparatus, or device. As used here, a "non-transitory computer readable storage medium" may include one or more of any suitable media to store the executable instructions of a computer program in one or more forms including an electronic, magnetic, optical, and electromagnetic form, such that the instruction execution machine, system, apparatus, or device may read (or fetch) the instructions from the tangible computer readable storage medium and execute the instructions to carry out the described methods. A non-exhaustive list of conventional exemplary tangible computer readable storage media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-Ray™ disc; and the like Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A computer-implemented method, comprising:
creating at least a portion of an instant messaging application that is configured to communicate with an apparatus via a network, the instant messaging application, when executed, configured to cause a device to:
display an instant messaging interface including a communicant message user interface element for receiving a text portion of a message and a send user interface element for sending the text portion of the message in response to a user selection thereof,
receive, from the apparatus and utilizing a communications agent on the device configured to receive incoming messages addressed to a communicant identifier associated with a user of the instant messaging application, a notification including a constraint that identifies a plurality of user interface elements includable in a form presentable via the instant messaging interface for constraining a generation of one or more data object requests in response to a selection on one or more of the plurality of user interface elements,
in response to the receipt, from the apparatus and utilizing the communications agent on the device configured to receive the incoming messages addressed to the communicant identifier associated with the user of the instant messaging application, of the notification including the constraint that identifies the plurality of user interface elements: display, via the instant messaging interface, the form including the user interface elements which include a first button and a second button that are conditionally displayed based on the receipt of the notification from the apparatus via the network,
receive, via the form of the instant messaging interface, an indication of a selection on the first button of the form displayed via the instant messaging interface,
in automatic response to the receipt, via the form of the instant messaging interface, of the indication of the selection on the first button of the form displayed via the instant messaging interface, and without requiring additional indication of additional user input after the indication of the selection on the first button of the form displayed via the instant messaging interface: generate a first data object request corresponding to the first button of the form displayed via the instant messaging interface, where the generation of the first data object request is constrained by the constraint and the constraint is included in the notification received from the apparatus via the network, in automatic response to the generation of the first data object request corresponding to the first button of the form displayed via the instant messaging interface, and without requiring additional indication of additional user input after the indication of the selection on the first button of the form displayed via the instant messaging interface: send, to the apparatus and utilizing the communications agent on the device configured to send outgoing messages addressed from the communicant identifier associated with the user of the instant messaging application, a first request message that includes the first data object request, after sending, to the apparatus and utilizing the communications agent on the device configured to send the outgoing messages addressed from the communicant identifier associated with the user of the instant messaging application, the first request message that includes the first data object request: receive, from the apparatus and utilizing the communications agent on the device configured to receive the incoming messages addressed to the communicant identifier associated with the user of the instant messaging application, a first response message that is automatically generated in response to the first request message, after sending, to the apparatus and utilizing the communications agent on the device configured to send the outgoing messages addressed from the communicant identifier associated with the user of the instant messaging application, the first request message that includes the first data object request: receive, from the apparatus and utilizing the communications agent on the device configured to receive the incoming messages addressed to the communicant identifier associated with the user of the instant messaging application, a first data object response including at least one first image, the first data object response being attached to the first response message and further being automatically selected for attachment based on the first data object request, in response to the receipt, from the apparatus and utilizing the communications agent on the device configured to receive the incoming messages addressed to the communicant identifier associated with the user of the instant messaging application, of the first response message and the first data object response including the at least one first image: display, via the instant messaging interface, the at least one first image, receive, via the form of the instant messaging interface, an indication of a selection on the second button of the form displayed via the instant messaging interface, in automatic response to the receipt, via the form of the instant messaging interface, of the indication of the selection on the second button of the form displayed via the instant messaging interface, and without requiring additional indication of additional user input after the indication of the selection on the second button of the form displayed via the instant messaging interface: generate a second data object request corresponding to the second button of the form displayed via the instant messaging interface, where the generation of the second data object request is constrained by the constraint, in automatic response to the generation of the second data object request corresponding to the second button of the form displayed via the instant messaging interface, and without requiring additional indication of additional user input after the indication of the selection on the second button of the form displayed via the instant messaging interface: send, to the apparatus and utilizing the communications agent on the device configured to send the outgoing messages addressed from the communicant identifier associated with the user of the instant messaging application, a second request message that includes the second data object request, after sending, to the apparatus and utilizing the communications agent on the device configured to send the outgoing messages addressed from the communicant identifier associated with the user of the instant messaging application, the second request message that includes the second data object request: receive, from the apparatus and utilizing the communications agent on the device configured to receive the incoming messages addressed to the communicant identifier associated with the user of the instant messaging application, a second response message that is automatically generated in response to the second request message, after sending, to the apparatus and utilizing the communications agent on the device configured to send the outgoing messages addressed from the communicant identifier associated with the user of the instant messaging application, the second request message that includes the second data object request: receive, from the apparatus and utilizing the communications agent on the device configured to receive the incoming messages addressed to the communicant identifier associated with the user of the instant messaging application, a second data object response including at least one second image, the second data object response being attached to the second response message and further being automatically selected for attachment based on the second data object request, and in response to the receipt, from the apparatus and utilizing the communications agent on the device configured to receive the incoming messages addressed to the communicant identifier associated with the user of the instant messaging application, of the second response message and the second data object response including the at least one second image: display, via the instant messaging interface, the at least one second image; and causing storage of the at least portion of the instant messaging application.

2. The computer-implemented method of claim 1, wherein the constraint that is received from the apparatus via the network is valid according to a specified schema.

3. The computer-implemented method of claim 1, wherein the constraint is based on a communication protocol that is utilized for communication between the apparatus and the instant messaging application.

4. The computer-implemented method of claim 1, wherein the constraint that is received from the apparatus via the network is represented at least in part by an instruction that is valid according to a programming language, wherein the instruction is included for enforcing the constraint and is at least partially identified by the form.

5. The computer-implemented method of claim 1, wherein the constraint that is received from the apparatus via the network identifies the at least one first image and the at least one second image.

6. The computer-implemented method of claim 1, wherein the constraint that is received from the apparatus via the network is: separate from an authentication of the user, separate from an access control that is based on a role, separate from a user identity, and separate from a group membership of the user.

7. The computer-implemented method of claim 1, wherein at least one of: the constraint is included in a received instant message, the constraint is identified in a received instant message, or the constraint is received in a communicant message that is received with a received instant message.

8. The computer-implemented method of claim 1, wherein at least one of: the notification is included in a communication along with an instant message, or the notification is an attachment to an instant message.

9. The computer-implemented method of claim 1, wherein the notification that is received from the apparatus via the network includes presentation data for presenting the plurality of user interface elements including the first button and the second button, and the presentation data is included in received image information, where at least one of the first data object request or the second data object request is automatically generated based on the image information.

10. The computer-implemented method of claim 1, wherein the instant messaging application is configured such that, when executed, the first request message and the second request message are generated based on the constraint.

11. The computer-implemented method of claim 1, wherein the first data object response and the second data object response are constrained based on the constraint.

12. The computer-implemented method of claim 1, wherein the instant messaging application is configured such that, when executed, the constraint prevents the first data object request from requesting content other than the at least one first image, and further prevents the second data object request from requesting content other than the at least one second image.

13. The computer-implemented method of claim 1, wherein the instant messaging application is configured such that, when executed, the generation of the first data object request is constrained by the constraint utilizing a schema that defines a vocabulary and a rule that constrains the generation of the first data object request, and at least one of the at least one first image or the at least one second image is displayed via the form.

14. The computer-implemented method of claim 1, wherein the instant messaging application is configured such that, when executed, the text portion of the message is capable of being as vague as language per the user, with any data object response being automatically generated by a bot based on the language and received for displaying a corresponding image.

15. The computer-implemented method of claim 1, wherein the instant messaging application, when executed, is configured to cause the device to:

display a third button with the at least one first image, receive, via the instant messaging interface, an indication of a selection on the third button displayed via the instant messaging interface, in automatic response to the receipt, via the instant messaging interface, of the indication of the selection on the third button displayed via the instant messaging interface, and without requiring additional indication of additional user input after the indication of the selection on the third button of the form displayed via the instant messaging interface: generate a third data object request corresponding to the third button displayed via the instant messaging interface, in automatic response to the generation of the third data object request corresponding to the third button displayed via the instant messaging interface, and without requiring additional indication of additional user input after the indication of the selection on the third button of the form displayed via the instant messaging interface: send, to the apparatus and utilizing the communications agent on the device configured to send outgoing messages addressed from the communicant identifier associated with the user of the instant messaging application, a third request message that includes the third data object request, after sending, to the apparatus and utilizing the communications agent on the device configured to send the outgoing messages addressed from the communicant identifier associated with the user of the instant messaging application, the third request message that includes the third data object request: receive, from the apparatus and utilizing the communications agent on the device configured to receive the incoming messages addressed to the communicant identifier associated with the user of the instant messaging application, a third response message that is automatically generated in response to the third request message, after sending, to the apparatus and utilizing the communications agent on the device configured to send the outgoing messages addressed from the communicant identifier associated with the user of the instant messaging application, the third request message that includes the third data object request: receive, from the apparatus and utilizing the communications agent on the device configured to receive the incoming messages addressed to the communicant identifier associated with the user of the instant messaging application, a third data object response including at least one third image, the third data object response being attached to the third response message and further being automatically selected for attachment based on the third data object request, and in response to the receipt, from the apparatus and utilizing the communications agent on the device configured to receive the incoming messages addressed to the communicant identifier associated with the user of the instant messaging application, of the third response message and the third data object response including the at least one third image: display, via the instant messaging interface, the at least one third image.

16. The computer-implemented method of claim 1, wherein:

the instant messaging application is configured to utilize the communications agent on the device to communicate the incoming messages when the user is a contactee and the outgoing messages when the user is a contactor, utilizing a communications protocol, such that the incoming messages and the outgoing messages are addressed using the communicant identifier which takes the form of a communication address associated with a communicant alias corresponding to the user;

the instant messaging interface is configured to simultaneously display at least a portion of at least one of the incoming messages and at least a portion of at least one of the outgoing messages in a form of a conversation which is simultaneously displayed with at least a portion of at least one of: the at least one first image or the at least one second image, where at least one of the at least one first image or the at least one second image is displayed to be part of the conversation.

17. The computer-implemented method of claim 16, wherein the communications protocol includes a real-time, store and forward, instant messaging, request/reply protocol on top of a Transmission Control Protocol/Internet Protocol (TCP/IP).

18. The computer-implemented method of claim 1, wherein at least one of:

the at least portion of the instant messaging application includes an entirety of the instant messaging application;
the device includes at least one of a personal computer or a mobile device;
the at least portion of the instant messaging application is created by a development thereof;
the instant messaging application is configured to cooperate with the apparatus by communicating with the apparatus;
the instant messaging application is configured such that interaction therewith is capable of invoking a network browser application;
the apparatus includes at least one of one or more servers, or one or more relays;
the apparatus is equipped with another communications agent;
the communicant identifier includes at least one of a contactor identifier or a contactee identifier;
in each instance of an operation including at least one of: the generation, the displaying, or the sending, in response to the receiving, the operation occurs in immediate response to the receiving;
in each instance of an operation including at least one of: the generation, the displaying, or the sending, in response to the receiving, the operation occurs after at least one intermediate operation that occurs in immediate response to the receiving;
each instance of the automatic response involves a response with no intermediate operation;
each instance of the automatic response involves a response with one or more intermediate automatic operations;
each instance of the automatic generation involves a generation with no intermediate operation;
each instance of the automatic generation involves a generation with one or more intermediate automatic operations;
each instance of the automatic selection involves a selection with no intermediate operation;
each instance of the automatic selection involves a selection with one or more intermediate automatic operations;
each instance of receiving includes receiving, from the apparatus, that which was received by the apparatus from a web service, a remote communication agent, or a remote data store;
each instance of sending includes sending, to the apparatus, that which is sent by the apparatus to a web service, a remote communication agent, or a remote data store;
at least one of the first button or the second button includes a button control that initiates a command in response to a user selection thereon;
at least one of the first button or the second button includes or is associated with a hyperlink or an image;
selection on at least one of the first button or the second button results in a call;
at least one of the first button or the second button is constructed using a mark-up language;
at least one of the first button or the second button is received as a message attachment;
at least one of the first button or the second button is associated with a uniform resource locator;
the indication of the selection on at least one of the first button or the second button does not invoke a network browser application;
the indication of the selection on at least one of the first button or the second button is received via the communicant message user interface element of the instant messaging interface in response to a detection of a user touch on a touchscreen of the device;
the indication of the selection on at least one of the first button or the second button includes a signal;
the indication of the selection includes selection information;
the indication of the selection on at least one of the first button or the second button is received from code associated with the communicant message user interface element;
the first button and the second button are conditionally displayed based on the receipt of the notification, by not being displayed if the notification is not received and by being displayed if the notification is received;
the communications agent is separate from the instant messaging application;
the communications agent is integrated with the instant messaging application;
the communications agent receives the incoming messages and sends the outgoing messages;
the incoming messages include automatically generated messages and the outgoing messages include messages edited by the user;
the incoming messages include automatically generated messages and the outgoing messages include messages prompted by the user;
the outgoing messages include the first request message and the second request message;
the incoming messages include the first response message and the second response message;
the addressing is automatic;
the addressing is manual;
the send user interface element includes a forward user interface element;
the send user interface element serves to send by forwarding;
the send user interface element includes the word "send" or "submit";
the first request message includes an initial request message;
the first data object request is in the first request message;
the first data object request is attached to the first request message;

the first button is capable of being selected and the second button is capable of not being selected in a first use scenario, the first button is capable of not being selected and the second button is capable of being selected in a second use scenario, and the first button is capable of being selected and the second button is capable of being selected in a third use scenario;

the first data object request corresponds to the first button of the form displayed via the instant messaging interface by being prompted by the selection thereon;

the form includes a markup language form;

the form includes one or more criterion elements;

the form includes at least one of a name or a type;

the form includes an image;

the form is included with the notification;

the form is received;

the plurality of user interface elements are included in the form after the receipt of the notification including the constraint;

the constraint includes the plurality of user interface elements;

the notification conforms to a schema to create a valid notification;

the notification is based on a schema that defines or otherwise identifies a valid notification for a particular type of communication or for a particular communications protocol supported by the communications agent;

the notification is constructed or otherwise created, based on constraint information;

the notification is constructed or otherwise created, based on constraint information received from a human;

the notification is in a communication based on a reserved keyword identifier;

the notification is detected based on content included in a message or based on metadata;

each instance of the generation includes construction;

each instance of the generation includes creation;

each instance of the generation includes retrieving at least one already-existing data structure from memory for use;

the first data object response is automatically selected for attachment based on the first data object request and the second data object response is automatically selected for attachment based on the second data object request, such that different data object responses are selected based on different data object requests;

the first data object response is automatically selected for attachment based on the first data object request and the second data object response is automatically selected for attachment based on the second data object request, such that each instance of the selection includes retrieving a corresponding response for each data object request;

the first data object request is generated without requiring the additional indication of additional user input after the indication of the selection on the first button, by not requiring the additional indication of additional user input after the indication of the selection on the first button while nevertheless allowing the additional indication of additional user input after the indication of the selection on the first button prior to the generation of the first data object;

the first data object request is generated without requiring the additional indication of additional user input after the indication of the selection on the first button, such that the first data object request is generated whether or not the additional indication of additional user input is received after the indication of the selection on the first button;

the first request is sent without requiring the additional indication of additional user input after the indication of the selection on the first button, by not requiring the additional indication of additional user input after the indication of the selection on the first button while nevertheless allowing the additional indication of additional user input after the indication of the selection on the first button prior to the first request being sent;

the first request is sent without requiring the additional indication of additional user input after the indication of the selection on the first button, such that the first request is sent whether or not the additional indication of additional user input is received after the indication of the selection on the first button;

the constraint includes a construction constraint;

the notification includes a constraint notification;

the constraint restricts data objects that are identifiable to a particular user in response to at least one of the first data object request or the second data object request;

the constraint restricts a construction of at least one of the first response message or the second response message;

the generation of one or more data object requests is constrained based on the form;

the generation of the one or more data object requests is constrained by presenting only the one or more of the plurality of user interface elements as options for generating the data object request;

the generation of the one or more data object requests is constrained based on the form by only presenting the one or more of the plurality of user interface elements as options for generating the data object request;

the generation of the first data object request is constrained by the constraint by only presenting the first button as an option for generating the first data object request;

the generation of the first data object request is constrained by the constraint by presenting only the first button as an option for generating the first data object request;

the generation of the first data object request is constrained by the constraint by only allowing the at least one first image to be received as a result of the first data object request;

the generation of the first data object request is constrained by the constraint by constraining a format of the first data object request;

the generation of the first data object request is constrained by the constraint by only allowing the at least one first image and accompanying content to be received as a result of the first data object request;

each instance of the generation includes receiving or identifying data for performing at least part of the generation;

the second data object response is an attachment of the second response message;

the second data object response is not included in a communicant message portion of a communication;

the second data object response is not included in a communicant message portion of a communication including the second response message;

the second data object response is not included in a communicant message portion of the second response message;

the second response message is represented in a data store in an execution environment;

the second response message is not presented inline or in a communicant message;

the second data object response is displayed to be attached to the second response message;

the first data object response is an attachment of the first response message;

the first data object response is not included in a communicant message portion of a communication;

the first data object response is not included in a communicant message portion of a communication including the first response message;

the first data object response is not included in a communicant message portion of the first response message;

the first response message is represented in a data store in an execution environment;

the first response message is not presented inline or in a communicant message;

the first data object response is displayed to be attached to the first response message; or the at least portion of the instant messaging application is part of a system, where the system further comprises the apparatus and the device.

19. A non-transitory computer-readable media storing computer instructions of an instant messaging application, that when executed by one or more processors of a device, cause the one or more processors to:

display an instant messaging interface including a communicant message user interface element for receiving a text portion of a message and a send user interface element for sending the text portion of the message in response to a user selection thereof, receive, from an apparatus and utilizing a communications agent on the device configured to receive incoming messages addressed to a communicant identifier associated with a user of the instant messaging application, a notification including a constraint that identifies a plurality of user interface elements includable in a form presentable via the instant messaging interface for constraining a generation of one or more data object requests based on the form in response to a selection on one or more of the plurality of user interface elements, in response to the receipt, from the apparatus and utilizing the communications agent on the device configured to receive the incoming messages addressed to the communicant identifier associated with the user of the instant messaging application, of the notification including the constraint that identifies the plurality of user interface elements: display, via the instant messaging interface, the form including the user interface elements which include a first button and a second button that are conditionally displayed based on the receipt of the notification from the apparatus via a network, receive, via the form of the instant messaging interface, an indication of a selection on the first button of the form displayed via the instant messaging interface, in automatic response to the receipt, via the form of the instant messaging interface, of the indication of the selection on the first button of the form displayed via the instant messaging interface, and without requiring additional indication of additional user input after the indication of the selection on the first button of the form displayed via the instant messaging interface: generate a first data object request corresponding to the first button of the form displayed via the instant messaging interface, where the generation of the first data object request is constrained by the constraint and the constraint is included in the notification received from the apparatus via the network, in automatic response to the generation of the first data object request corresponding to the first button of the form displayed via the instant messaging interface, and without requiring additional indication of additional user input after the indication of the selection on the first button of the form displayed via the instant messaging interface: send, to the apparatus and utilizing the communications agent on the device configured to send outgoing messages addressed from the communicant identifier associated with the user of the instant messaging application, a first request message that includes the first data object request, after sending, to the apparatus and utilizing the communications agent on the device configured to send the outgoing messages addressed from the communicant identifier associated with the user of the instant messaging application, the first request message that includes the first data object request: receive, from the apparatus and utilizing the communications agent on the device configured to receive the incoming messages addressed to the communicant identifier associated with the user of the instant messaging application, a first response message that is automatically generated in response to the first request message, after sending, to the apparatus and utilizing the communications agent on the device configured to send the outgoing messages addressed from the communicant identifier associated with the user of the instant messaging application, the first request message that includes the first data object request: receive, from the apparatus and utilizing the communications agent on the device configured to receive the incoming messages addressed to the communicant identifier associated with the user of the instant messaging application, a first data object response including at least one first image, the first data object response being attached to the first response message and further being automatically selected for attachment based on the first data object request, in response to the receipt, from the apparatus and utilizing the communications agent on the device configured to receive the incoming messages addressed to the communicant identifier associated with the user of the instant messaging application, of the first response message and the first data object response including the at least one first image: display, via the instant messaging interface, the at least one first image, receive, via the form of the instant messaging interface, an indication of a selection on the second button of the form displayed via the instant messaging interface, in automatic response to the receipt, via the form of the instant messaging interface, of the indication of the selection on the second button of the form displayed via the instant messaging interface, and without requiring additional indication of additional user input after the indication of the selection on the second button of the form displayed via the instant messaging interface: generate a second data object request corresponding to the second button of the form displayed via the instant messaging interface, where the generation of the second data object request is constrained by the constraint, in automatic response to the generation of the second data object request corresponding to the second button of the form displayed via the instant messaging interface, and without requiring additional indication of additional user input after the indication of the selection on the second button of the form displayed via the instant messaging interface: send, to the apparatus and utilizing the communications agent on the device configured to send the outgoing messages addressed from the communicant identifier associated with the user of the instant messaging application, a second request message that includes the second data object request, after sending, to the apparatus and utilizing the communications agent on the device configured to send the outgoing messages addressed from the communicant identifier associated with the user of the instant messaging application, the second request message that includes the second data object request: receive, from the apparatus and utilizing the communications agent on the device configured to receive the incoming messages addressed to the communicant identifier associated with the user of the instant messaging application, a second response message that is automatically generated in response to the second request message, after sending, to the apparatus and utilizing the communications agent on the device configured to send the outgoing messages addressed from the communicant identifier associated with the user of the instant messaging application, the second request message that includes the second data object request: receive, from the apparatus and utilizing the communications agent on the device configured to receive the incoming messages addressed to the communicant identifier associated with the user of the instant messaging application, a second data object response including at least one second image, the second data object response being attached to the second response message and further being automatically selected for attachment based on the second data object request, and in response to the receipt, from the apparatus and utilizing the communications agent on the device configured to receive the incoming messages addressed to the communicant identifier associated with the user of the instant messaging application, of the second response message and the second data object response including the at least one second image: display, via the instant messaging interface, the at least one second image.

20. The non-transitory computer-readable media of claim 19, wherein:
the instant messaging application is configured to utilize the communications agent on the device to communicate the incoming messages when the user is a contactee and the outgoing messages when the user is a contactor, utilizing a communications protocol, such that the incoming messages and the outgoing messages are addressed using the communicant identifier which takes the form of a communication address associated with a communicant alias corresponding to the user;
the instant messaging interface is configured to simultaneously display at least a portion of at least one of the incoming messages and at least a portion of at least one of the outgoing messages in a form of a conversation which is simultaneously displayed with at least a portion of at least one of: the at least one first image or the at least one second image, where at least one of the at least one first image or the at least one second image is displayed to be part of the conversation.

21. The non-transitory computer-readable media of claim 20, wherein the communications protocol includes a real-time, store and forward, instant messaging, request/reply protocol on top of a Transmission Control Protocol/Internet Protocol (TCP/IP).

22. The non-transitory computer-readable media of claim 20, wherein:
at least one of: the constraint is included in a received instant message, the constraint is identified in a received instant message, or the constraint is received in a communicant message that is received with a received instant message;
text of at least one of the outgoing messages is capable of being as vague as language per the user, with any data object response being automatically generated based on the language and a related search, and being received for displaying a corresponding image; and
the generation of the first data object request is constrained by the constraint utilizing a schema that defines at least one of a vocabulary or a rule that constrains the generation of the first data object request.

23. The non-transitory computer-readable media of claim 22, wherein the instant messaging application, when executed, is configured to cause the device to:
display a third button with the at least one first image,
receive, via the instant messaging interface, an indication of a selection on the third button displayed via the instant messaging interface,
in automatic response to the receipt, via the instant messaging interface, of the indication of the selection on the third button displayed via the instant messaging interface, and without requiring additional indication of additional user input after the indication of the selection on the third button of the form displayed via the instant messaging interface: generate a third data object request corresponding to the third button displayed via the instant messaging interface,
in automatic response to the generation of the third data object request corresponding to the third button displayed via the instant messaging interface, and without requiring additional indication of additional user input after the indication of the selection on the third button of the form displayed via the instant messaging interface: send, to the apparatus and utilizing the communications agent on the device configured to send outgoing messages addressed from the communicant identifier associated with the user of the instant messaging application, a third request message that includes the third data object request,
after sending, to the apparatus and utilizing the communications agent on the device configured to send the outgoing messages addressed from the communicant identifier associated with the user of the instant messaging application, the third request message that includes the third data object request: receive, from the apparatus and utilizing the communications agent on the device configured to receive the incoming messages addressed to the communicant identifier associated with the user of the instant messaging application, a third response message that is automatically generated in response to the third request message,
after sending, to the apparatus and utilizing the communications agent on the device configured to send the outgoing messages addressed from the communicant identifier associated with the user of the instant messaging application, the third request message that includes the third data object request: receive, from the apparatus and utilizing the communications agent on the device configured to receive the incoming messages addressed to the communicant identifier associated with the user of the instant messaging application, a third data object response including at least one third image, the third data object response being attached to the third response message and further being automatically selected for attachment based on the third data object request, and in response to the receipt, from the apparatus and utilizing the communications agent on the device configured to receive the incoming messages addressed to the communicant identifier associated with the user of the instant messaging application, of the third response message and the third data object response including the at least one third image: display, via the instant messaging interface, the at least one third image.

24. A computer-implemented method, comprising:

creating at least a portion of an instant messaging application that is configured to communicate with an apparatus via a network, the instant messaging application, when executed, configured to cause a device to:

display an instant messaging interface including a message user interface element for receiving a message text portion and a send user interface element for sending the message text portion in response to a user selection thereof, receive, from the apparatus and with a communicant identifier associated with a user of the instant messaging application, a menu-equipped instant message with a constraint that identifies a plurality of user interface elements presentable via the instant messaging interface for constraining a generation of one or more data object requests in response to a selection on one or more of the plurality of user interface elements, in response to the receipt, from the apparatus and with the communicant identifier associated with the user of the instant messaging application, of the menu-equipped instant message including the constraint that identifies the plurality of user interface elements: display, via the instant messaging interface, the menu-equipped instant message including the user interface elements which include a first menu item and a second menu item that are conditionally displayed based on the receipt of the menu-equipped instant message from the apparatus via the network, receive, via the menu-equipped instant message of the instant messaging interface, an indication of a selection on the first menu item of the menu-equipped instant message displayed via the instant messaging interface, in automatic response to the receipt, via the menu-equipped instant message of the instant messaging interface, of the indication of the selection on the first menu item of the menu-equipped instant message displayed via the instant messaging interface, and without requiring additional indication of additional user input after the indication of the selection on the first menu item of the menu-equipped instant message displayed via the instant messaging interface: generate a first data object request, where the generation of the first data object request is constrained by the constraint, in automatic response to the generation of the first data object request, and without requiring additional indication of additional user input after the indication of the selection on the first menu item of the menu-equipped instant message displayed via the instant messaging interface: send, to the apparatus and with the communicant identifier associated with the user of the instant messaging application, the first data object request, after sending, to the apparatus and with the communicant identifier associated with the user of the instant messaging application, the first data object request: receive, from the apparatus and with the communicant identifier associated with the user of the instant messaging application, a first data object response including at least one first image and being automatically generated in response to the first data object request, in response to the receipt, from the apparatus and with the communicant identifier associated with the user of the instant messaging application, of the first data object response including the at least one first image: display, via the instant messaging interface, the at least one first image, receive, via the menu-equipped instant message of the instant messaging interface, an indication of a selection on the second menu item of the menu-equipped instant message displayed via the instant messaging interface, in automatic response to the receipt, via the menu-equipped instant message of the instant messaging interface, of the indication of the selection on the second menu item of the menu-equipped instant message displayed via the instant messaging interface, and without requiring additional indication of additional user input after the indication of the selection on the second menu item of the menu-equipped instant message displayed via the instant messaging interface: generate a second data object request, where the generation of the second data object request is constrained by the constraint, in automatic response to the generation of the second data object request, and without requiring additional indication of additional user input after the indication of the selection on the second menu item of the menu-equipped instant message displayed via the instant messaging interface: send, to the apparatus and with the communicant identifier associated with the user of the instant messaging application, the second data object request, after sending, to the apparatus and with the communicant identifier associated with the user of the instant messaging application, the second data object request: receive, from the apparatus and with the communicant identifier associated with the user of the instant messaging application, a second data object response including at least one second image and being automatically generated in response to the second data object request, and in response to the receipt, from the apparatus and with the communicant identifier associated with the user of the instant messaging application, of the second data object response including the at least one second image: display, via the instant messaging interface, the at least one second image; and causing storage of the at least portion of the instant messaging application.

25. A non-transitory computer-readable media storing computer instructions of an instant messaging application, that when executed by one or more processors of a device, cause the one or more processors to:
- display an instant messaging interface including a message user interface element for receiving a message text portion and a send user interface element for sending the message text portion in response to a user selection thereof,
- receive, from an apparatus and with a communicant identifier associated with a user of the instant messaging application, a menu-equipped instant message with a constraint that identifies a plurality of user interface elements presentable via the instant messaging interface for constraining a generation of one or more data object requests in response to a selection on one or more of the plurality of user interface elements,
- in response to the receipt, from the apparatus and with the communicant identifier associated with the user of the instant messaging application, of the menu-equipped instant message including the constraint that identifies the plurality of user interface elements: display, via the instant messaging interface, the menu-equipped instant message including the user interface elements which include a first menu item and a second menu item that are conditionally displayed based on the receipt of the menu-equipped instant message from the apparatus via a network,
- receive, via the menu-equipped instant message of the instant messaging interface, an indication of a selection on the first menu item of the menu-equipped instant message displayed via the instant messaging interface,
- in automatic response to the receipt, via the menu-equipped instant message of the instant messaging interface, of the indication of the selection on the first menu item of the menu-equipped instant message displayed via the instant messaging interface, and without requiring additional indication of additional user input after the indication of the selection on the first menu item of the menu-equipped instant message displayed via the instant messaging interface: generate a first data object request, where the generation of the first data object request is constrained by the constraint,
- in automatic response to the generation of the first data object request, and without requiring additional indication of additional user input after the indication of the selection on the first menu item of the menu-equipped instant message displayed via the instant messaging interface: send, to the apparatus and with the communicant identifier associated with the user of the instant messaging application, the first data object request,
- after sending, to the apparatus and with the communicant identifier associated with the user of the instant messaging application, the first data object request: receive, from the apparatus and with the communicant identifier associated with the user of the instant messaging application, a first data object response including at least one first image and being automatically generated in response to the first data object request,
- in response to the receipt, from the apparatus and with the communicant identifier associated with the user of the instant messaging application, of the first data object response including the at least one first image: display, via the instant messaging interface, the at least one first image,
- receive, via the menu-equipped instant message of the instant messaging interface, an indication of a selection on the second menu item of the menu-equipped instant message displayed via the instant messaging interface,
- in automatic response to the receipt, via the menu-equipped instant message of the instant messaging interface, of the indication of the selection on the second menu item of the menu-equipped instant message displayed via the instant messaging interface, and without requiring additional indication of additional user input after the indication of the selection on the second menu item of the menu-equipped instant message displayed via the instant messaging interface: generate a second data object request, where the generation of the second data object request is constrained by the constraint,
- in automatic response to the generation of the second data object request, and without requiring additional indication of additional user input after the indication of the selection on the second menu item of the menu-equipped instant message displayed via the instant messaging interface: send, to the apparatus and with the communicant identifier associated with the user of the instant messaging application, the second data object request,
- after sending, to the apparatus and with the communicant identifier associated with the user of the instant messaging application, the second data object request: receive, from the apparatus and with the communicant identifier associated with the user of the instant messaging application, a second data object response including at least one second image and being automatically generated in response to the second data object request, and
- in response to the receipt, from the apparatus and with the communicant identifier associated with the user of the instant messaging application, of the second data object response including the at least one second image: display, via the instant messaging interface, the at least one one second image.

26. The non-transitory computer-readable media of claim 25, wherein the instant messaging application is configured such that, when executed, the menu-equipped instant message that is received from the apparatus via the network is displayed, after being received, in a dynamic portion of the instant messaging interface that displays the at least one first image, the at least one second image, the first data object request, and the second data object request as instant messages in a conversation that further includes the first menu item and the second menu item of the menu-equipped instant message; and the message user interface element and the send user interface element are part of a static portion of the instant messaging interface such that the message user interface element and the send user interface element are displayed independent of the instant messages in the conversation.

27. The non-transitory computer-readable media of claim 26, wherein the instant messaging application is configured to utilize a first communications agent on the device to communicate incoming messages when the user is a contactee and outgoing messages when the user is a contactor, utilizing a communications protocol, such that the incoming messages and the outgoing messages are addressed using the communicant identifier which takes the form of a communication address associated with a communicant alias corresponding to the user.

28. The non-transitory computer-readable media of claim 27, wherein the communications protocol includes a real-time, store and forward, instant messaging, request/reply protocol on top of a Transmission Control Protocol/Internet Protocol (TCP/IP), and the apparatus communicates with a web service utilizing a hypertext transfer protocol (HTTP).

29. The non-transitory computer-readable media of claim 27, wherein the communications protocol includes a publish-subscribe protocol on top of a Transmission Control Protocol/Internet Protocol (TCP/IP) and further wherein the publish-subscribe protocol includes an Extensible Messaging and Presence Protocol (XMPP).

30. The non-transitory computer-readable media of claim 27, wherein the instant messaging application is configured such that the first button and the second button are automatically displayed in response to the receipt of the notification from the apparatus via the network.

* * * * *